(12) United States Patent
Zhang et al.

(10) Patent No.: US 12,196,923 B2
(45) Date of Patent: Jan. 14, 2025

(54) OPTICAL IMAGING LENS ASSEMBLY

(71) Applicant: ZHEJIANG SUNNY OPTICS CO.,LTD., Zhejiang (CN)

(72) Inventors: Yi Zhang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

(*) Notice: Subject to any disclaimer, the term of this patent is extended or adjusted under 35 U.S.C. 154(b) by 637 days.

(21) Appl. No.: 17/499,898

(22) Filed: Oct. 13, 2021

(65) Prior Publication Data
US 2022/0113517 A1 Apr. 14, 2022

(30) Foreign Application Priority Data
Oct. 13, 2020 (CN) .......................... 202011091733.2

(51) Int. Cl.
G02B 13/00 (2006.01)
G02B 9/64 (2006.01)
G02B 27/00 (2006.01)

(52) U.S. Cl.
CPC ........... *G02B 13/0045* (2013.01); *G02B 9/64* (2013.01); *G02B 27/0025* (2013.01)

(58) Field of Classification Search
CPC .............................. G02B 13/0045; G02B 9/64
See application file for complete search history.

(56) References Cited

U.S. PATENT DOCUMENTS

| | | | | |
|---|---|---|---|---|
| 9,507,125 B2* | 11/2016 | Hashimoto | ........ | G02B 27/0025 |
| 10,330,892 B2* | 6/2019 | Hashimoto | .............. | G02B 9/64 |
| 10,656,390 B2* | 5/2020 | Hashimoto | ........ | G02B 13/0045 |
| 11,513,319 B2* | 11/2022 | Nitta | ....................... | G02B 13/18 |
| 11,543,627 B2* | 1/2023 | Huang | ............... | G02B 13/0045 |
| 11,635,587 B2* | 4/2023 | Kamada | ................... | G02B 9/64 |
| | | | | 359/708 |

(Continued)

FOREIGN PATENT DOCUMENTS

CN 208636558 U 3/2019
CN 111308663 A 6/2020
(Continued)

OTHER PUBLICATIONS

The first Office action of counterpart CN application No. 202011091733.2 was issued on Jul. 15, 2024.

*Primary Examiner* — Christopher Stanford
(74) *Attorney, Agent, or Firm* — Samson G. Yu

(57) ABSTRACT

The disclosure provides an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a refractive power; a sixth lens with a positive refractive power; and a seventh lens with a refractive power; Semi-FOV is a half of a maximum field of view of the optical imaging lens assembly, and an effective focal length f of the optical imaging lens assembly and Semi-FOV satisfy f*tan(Semi-FOV)≥5.0 mm; a curvature radius R11 of an object-side surface of the sixth lens, a curvature radius R12 of an image-side surface of the sixth lens and the effective focal length f of the optical imaging lens assembly satisfy 5.0<f/R11+f/R12<7.0.

17 Claims, 18 Drawing Sheets

(56) References Cited

U.S. PATENT DOCUMENTS

| | | | |
|---|---|---|---|
| 11,867,880 B2* | 1/2024 | Wang | G02B 27/0025 |
| 2019/0369368 A1 | 12/2019 | Jung et al. | |
| 2021/0302702 A1* | 9/2021 | Zhang | G02B 13/0045 |

FOREIGN PATENT DOCUMENTS

| CN | 111399183 A | * | 7/2020 |
|---|---|---|---|
| CN | 111458850 A | | 7/2020 |
| CN | 211086744 U | | 7/2020 |
| CN | 212623312 U | | 2/2021 |
| CN | 113484982 A | * | 10/2021 |

* cited by examiner longitudinal aberration curve

OPTICAL IMAGING LENS ASSEMBLY

CROSS-REFERENCE TO RELATED PRESENT INVENTION(S)

The disclosure claims priority to and the benefit of Chinese Patent Present invention No. 202011091733.2, filed in the China National Intellectual Property Administration (CNIPA) on 13 Oct. 2020, which is incorporated herein by reference in its entirety.

TECHNICAL FIELD

The disclosure relates to the technical field of optical imaging devices, and particularly to an optical imaging lens assembly.

BACKGROUND

With the popularization of electronic products such as mobile phones and tablet computers, requirements of people on the portability, light and thin design, etc., of electronic products have increased. In addition, with the performance improvement and size reduction of Charge-Coupled Devices (CCD) and Complementary Metal-Oxide Semiconductor (CMOS) image sensors, corresponding imaging lens assemblies are also required to satisfy the requirement of high imaging quality. Moreover, for satisfying the requirement on the imaging quality, not only is a design subject distance required to be satisfied, but also a requirement on a microspur increases.

That is, there is such a problem in the related art that an optical imaging lens assembly is unstable in imaging quality.

SUMMARY

Some embodiments of the disclosure provide an optical imaging lens assembly, to solve the problem in the related art that an optical imaging lens assembly is unstable in imaging quality.

In order to achieve the objective, an embodiment of the disclosure provides an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a refractive power; a sixth lens with a positive refractive power; and a seventh lens with refractive power; Semi-FOV is a half of a maximum field of view of the optical imaging lens assembly, and an effective focal length f of the optical imaging lens assembly and Semi-FOV satisfy f*tan(Semi-FOV)>5.0 mm; a curvature radius R11 of an object-side surface of the sixth lens, a curvature radius R12 of an image-side surface of the sixth lens and the effective focal length f of the optical imaging lens assembly satisfy 5.0<f/R11+f/R12<7.0; a curvature radius R13 of an object-side surface of the seventh lens, a curvature radius R14 of an image-side surface of the seventh lens and an effective focal length f7 of the seventh lens satisfy f7/(R13−R14)≤−2.0.

In an implementation mode, the effective focal length f of the optical imaging lens assembly, a curvature radius R1 of an object-side surface of the first lens and a curvature radius R8 of an image-side surface of the fourth lens satisfy 1.0<f/R1+f/R8<2.0.

In an implementation mode, the effective focal length f of the optical imaging lens assembly and a curvature radius R10 of an image-side surface of the fifth lens satisfy 0<f/R10<1.5.

In an implementation mode, the effective focal length f of the optical imaging lens assembly, a curvature radius R3 of an object-side surface of the second lens and a curvature radius R4 of an image-side surface of the second lens satisfy 1.4≤f/(R3−R4)<3.5.

In an implementation mode, the curvature radius R11 of the object-side surface of the sixth lens, the curvature radius R12 of the image-side surface of the sixth lens and a center thickness CT6 of the sixth lens satisfy 2<(R12−R11)/CT6<4.5.

In an implementation mode, a center thickness CT6 of the sixth lens and a center thickness CT7 of the seventh lens satisfy 1≤CT7/CT6≤2.1.

In an implementation mode, the effective focal length f of the optical imaging lens assembly and the effective focal length f7 of the seventh lens satisfy −1.0<f/f7<−0.5.

In an implementation mode, an effective focal length f1 of the first lens and a combined focal length f12 of the first lens and the second lens satisfy 0.9≤f12/f1≤1.5.

In an implementation mode, the effective focal length f of the optical imaging lens assembly and a combined focal length f567 from the fifth lens to the seventh lens satisfy −0.5<f/f567<0.

In an implementation mode, the effective focal length f of the optical imaging lens assembly and an effective focal length f4 of the fourth lens satisfy 0<f/f4<0.5.

In an implementation mode, an effective focal length f6 of the sixth lens and the effective focal length f7 of the seventh lens satisfy −1.5<f6/f7<−0.5.

In an implementation mode, Yc61 is a critical point height of the object-side surface of the sixth lens closest to the optical axis, Yc62 is a critical point height of the image-side surface of the sixth lens closest to the optical axis, and Yc61 and Yc62 satisfy 1<Yc62/Yc61<1.3.

In an implementation mode, YT61 is a vector height of a critical point of the object-side surface of the sixth lens closest to the optical axis and YT62 is a vector height of a critical point of the image-side surface of the sixth lens closest to the optical axis, and YT61 and YT62 satisfy 1≤YT62/YT61<1.2.

In an implementation mode, $ET5_{max}$ is a maximum edge thickness of the fifth lens from the optical axis to an inflection point of an object-side surface of the fifth lens farthest from the optical axis, $ET5_{min}$ is a minimum edge thickness of the fifth lens from the optical axis to the inflection point of the object-side surface of the fifth lens farthest from the optical axis, and $ET5_{max}$ and $ET5_{min}$ satisfy $(ET5_{max}-ET5_{min})/ET5_{min} \leq 0.25$.

In an implementation mode, an abbe number V4 of the fourth lens, an abbe number V5 of the fifth lens, an abbe number V6 of the sixth lens and an abbe number V7 of the seventh lens satisfy 0<(V4+V6+V7)/3−V5<20.

In an implementation mode, a focusing movement distance ΔT of the optical imaging lens assembly on the optical axis satisfies |ΔT|≤0.5 mm when a subject distance changes from an infinite distance to 8 centimeters.

Another embodiment of the disclosure provides an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a refractive power; a sixth lens with a positive refractive power; and a seventh lens with a refractive power; Semi-FOV is a half of a maximum field of view of the optical imaging lens assembly, and an effective focal length f of the optical imaging lens assembly and Semi-FOV satisfy f*tan (Semi-FOV)≥5.0 mm; a curvature radius R11 of an object-side surface of the sixth lens, a curvature radius R12 of an image-side surface of the sixth lens and the effective focal length f of the optical imaging lens assembly satisfy 5.0<f/R11+f/R12<7.0; an air space T23 between the second lens and the third lens on the optical axis, an air space T45 between the fourth lens and the fifth lens on the optical axis and an air space T67 between the sixth lens and the seventh lens on the optical axis satisfy 0<(T67−T23)/(T67−T45) ≤1.3.

In an implementation mode, a curvature radius R13 of an object-side surface of the seventh lens, a curvature radius R14 of an image-side surface of the seventh lens and an effective focal length f7 of the seventh lens satisfy f7/(R13−R14)≤−2.0.

In an implementation mode, the effective focal length f of the optical imaging lens assembly, a curvature radius R1 of an object-side surface of the first lens and a curvature radius R8 of an image-side surface of the fourth lens satisfy 1.0<f/R1+f/R8<2.0.

In an implementation mode, the effective focal length f of the optical imaging lens assembly and a curvature radius R10 of an image-side surface of the fifth lens satisfy 0</R10<1.5.

In an implementation mode, the effective focal length f of the optical imaging lens assembly, a curvature radius R3 of an object-side surface of the second lens and a curvature radius R4 of an image-side surface of the second lens satisfy 1.4≤f/(R3−R4)<3.5.

In an implementation mode, the curvature radius R11 of the object-side surface of the sixth lens, the curvature radius R12 of the image-side surface of the sixth lens and a center thickness CT6 of the sixth lens satisfy 2<(R12−R11)/CT6<4.5.

In an implementation mode, a center thickness CT6 of the sixth lens and a center thickness CT7 of the seventh lens satisfy 1≤CT7/CT6≤2.1.

In an implementation mode, the effective focal length f of the optical imaging lens assembly and the effective focal length f7 of the seventh lens satisfy −1.0<f/f7<−0.5.

In an implementation mode, an effective focal length f1 of the first lens and a combined focal length f12 of the first lens and the second lens satisfy 0.9≤f12/f1≤1.5.

In an implementation mode, the effective focal length f of the optical imaging lens assembly and a combined focal length f567 from the fifth lens to the seventh lens satisfy −0.5<f/f567<0.

In an implementation mode, the effective focal length f of the optical imaging lens assembly and an effective focal length f4 of the fourth lens satisfy 0<f/f4<0.5.

In an implementation mode, an effective focal length f6 of the sixth lens and an effective focal length f7 of the seventh lens satisfy −1.5<f6/f7<−0.5.

In an implementation mode, Yc61 is a critical point height of the object-side surface of the sixth lens closest to the optical axis, Yc62 is a critical point height of the image-side surface of the sixth lens closest to the optical axis, and Yc61 and Yc62 satisfy 1<Yc62/Yc61<1.3.

In an implementation mode, YT61 is a vector height of a critical point of the object-side surface of the sixth lens closest to the optical axis and YT62 is a vector height of a critical point of the image-side surface of the sixth lens closest to the optical axis, and YT61 and YT62 satisfy 1≤YT62/YT61<1.2.

In an implementation mode, $ET5_{max}$ is a maximum edge thickness of the fifth lens from the optical axis to an inflection point of an object-side surface of the fifth lens farthest from the optical axis, $ET5_{min}$ is a minimum edge thickness of the fifth lens from the optical axis to the inflection point of the object-side surface of the fifth lens farthest from the optical axis, and $ET5_{max}$ and $ET5_{min}$ satisfy $(ET5_{max}-ET5_{min})/ET5_{min} \le 0.25$.

In an implementation mode, an abbe number V4 of the fourth lens, an abbe number V5 of the fifth lens, an abbe number V6 of the sixth lens and an abbe number V7 of the seventh lens satisfy 0<(V4+V6+V7)/3−V5<20.

In an implementation mode, a focusing movement distance ΔT of the optical imaging lens assembly on the optical axis satisfies |ΔT|50.5 mm when a subject distance changes from an infinite distance to 8 centimeters.

With the adoption of the technical solutions of the disclosure, the optical imaging lens assembly sequentially includes from the object side to the image side along the optical axis: the first lens with the positive refractive power; the second lens with the refractive power; the third lens with the refractive power; the fourth lens with the refractive power; the fifth lens with the refractive power; the sixth lens with the positive refractive power; and the seventh lens with the refractive power; Semi-FOV is the half of the maximum field of view of the optical imaging lens assembly, and the effective focal length f of the optical imaging lens assembly and Semi-FOV satisfy f*tan(Semi-FOV)≥5.0 mm; the curvature radius R11 of the object-side surface of the sixth lens, the curvature radius R12 of the image-side surface of the sixth lens, and the effective focal length f of the optical imaging lens assembly satisfy 5.0<f/R11+f/R12<7.0; the curvature radius R13 of the object-side surface of the seventh lens, the curvature radius R14 of the image-side surface of the seventh lens and the effective focal length f7 of the seventh lens satisfy f7/(R13−R14)≤−2.0.

The refractive power is configured reasonably, so that an astigmatism and a distortion may be reduced effectively, and the imaging quality of the optical imaging lens assembly may be improved greatly. The effective focal length f of the optical imaging lens assembly and Semi-FOV are configured reasonably, so that the size of the system may be effectively reduced, a deflection angle of a ray is relatively small, a large image surface is achieved, and meanwhile, difficulties in machining are reduced. The curvature radius R11 of the object-side surface of the sixth lens may be controlled to effectively control the shape of the sixth lens E6 to achieve relatively high imaging quality of the optical imaging lens assembly in a microspur mode. In addition, the seventh lens E7 may be restricted to balance a spherical aberration generated by the first six lenses by a residual spherical aberration of the seventh lens E7 after balancing to further finely adjust and control a spherical aberration of the optical imaging lens assembly and strengthen the accurate control over an aberration in an on-axis field of view. Such a setting is favorable for achieving relatively high imaging quality of the optical imaging lens assembly under continuous subject distances.

BRIEF DESCRIPTION OF THE DRAWINGS

The drawings forming a part of the disclosure in the specification are adopted to provide a further understanding to the disclosure. Schematic embodiments of the disclosure and descriptions thereof are adopted to explain the disclosure and not intended to form improper limits to the disclosure. In the drawings.

Figure 1:
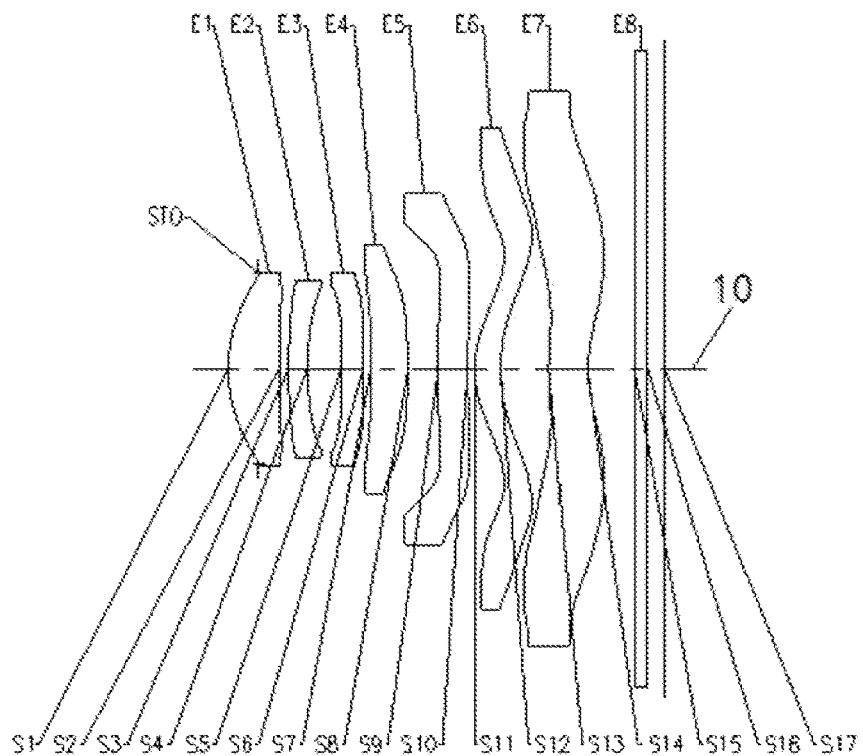
FIG. 1 shows a structural schematic diagram of an optical imaging lens assembly according to Example 1 of the disclosure.

The drawings include the following reference signs:

10: an optical axis; STO: a diaphragm; E1: a first lens; S1: an object-side surface of the first lens; S2: an image-side surface of the first lens; E2: a second lens; S3: an object-side surface of the second lens; S4: an image-side surface of the second lens; E3: a third lens; S5: an object-side surface of the third lens; S6: an image-side surface of the third lens; E4: a fourth lens; S7: an object-side surface of the fourth lens; S8: an image-side surface of the fourth lens; E5: a fifth lens; S9: an object-side surface of the fifth lens; S10: an image-side surface of the fifth lens; E6: a sixth lens; S11: an object-side surface of the sixth lens; S12: an image-side surface of the sixth lens; E7: a seventh lens; S13: an object-side surface of the seventh lens; S14: an image-side surface of the seventh lens; E8: an optical filter; S15: an object-side surface of the optical filter; S16: an image-side surface of the optical filter; and S17: an imaging surface.

DETAILED DESCRIPTION OF THE EMBODIMENTS

It is to be noted that the embodiments in the disclosure and characteristics in the embodiments may be combined without conflicts. The disclosure will be described below with reference to the drawings and in combination with the embodiments in detail.

It is to be pointed out that, unless otherwise specified, all technical and scientific terms used in the disclosure have the same meanings as commonly understood by those of ordinary skill in the art of the disclosure.

In the disclosure, unless conversely specified, the used orientation terms "upper, lower, top, and bottom" are usually for the directions shown in the drawings, or for a component in a vertical, perpendicular, or gravity direction. Similarly, for convenient understanding and description, "inner and outer" refer to inner and outer relative to a contour of each component. However, these orientation terms are not intended to limit the disclosure.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis 10. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, close to an object side, of each lens is called an object-side surface of the lens, and a surface, close to an image side, of each lens is called an image-side surface of the lens. A surface type of the paraxial region may be judged according to a judgment manner known to those of ordinary skill in the art, and whether a surface is concave or convex is judged according to whether an R value is positive or negative (R refers to a curvature radius of the paraxial region, usually refers to an R value on lens data in optical software). For example, an object-side surface is determined as a convex surface if the R value is positive, and is determined as a concave surface if the R value is negative. An image-side surface is determined as a concave surface if the R value is positive, and is determined as a convex surface is the R value is negative.

For solving the problem in the related art that an optical imaging lens assembly is unstable in imaging quality, the disclosure provides an optical imaging lens assembly.

Embodiment 1

As shown in FIGS. 1-35, an optical imaging lens assembly sequentially includes from an object side to an image side along an optical axis 10: a first lens E1 with a positive refractive power, a second lens E2 with a refractive power, a third lens E3 with a refractive power, a fourth lens E4 with a refractive power, a fifth lens E5 with a refractive power, a sixth lens E6 with a positive refractive power, and a seventh lens E7 with a refractive power. Semi-FOV is a half of a maximum field of view of the optical imaging lens assembly, and an effective focal length f of the optical imaging lens assembly and Semi-FOV satisfy f*tan(Semi-FOV)≥5.0 mm; a curvature radius R11 of an object-side surface of the sixth lens, a curvature radius R12 of an image-side surface of the sixth lens and the effective focal length f of the optical imaging lens assembly satisfy 5.0<f/R11+f/R12<7.0; a curvature radius R13 of an object-side surface of the seventh lens, a curvature radius R14 of an image-side surface of the seventh lens and an effective focal length f7 of the seventh lens satisfy f7/(R13−R14)≤−2.0.

More specifically, the effective focal length f of the optical imaging lens assembly and Semi-FOV may satisfy 5.1 mm≤f*tan (Semi-FOV)≤5.3 mm.

More specifically, the curvature radius R11 of the object-side surface of the sixth lens, the curvature radius R12 of the image-side surface of the sixth lens and the effective focal length f of the optical imaging lens assembly may satisfy 5.3≤f/R11+f/R12≤6.2.

More specifically, the curvature radius R13 of the object-side surface of the seventh lens, the curvature radius R14 of the image-side surface of the seventh lens and the effective focal length f7 of the seventh lens may satisfy −7.4≤f7/(R13−R14)≤−2.0.

The refractive power is configured reasonably, so that an astigmatism and a distortion may be reduced effectively, and the imaging quality of the optical imaging lens assembly may be improved greatly. The effective focal length f of the optical imaging lens assembly and Semi-FOV are configured reasonably, so that the size of the system may be effectively reduced, a deflection angle of a ray is relatively small, a large image surface is achieved, and meanwhile, difficulties in machining are reduced. The curvature radius R11 of the object-side surface of the sixth lens may be controlled to effectively control the shape of the sixth lens E6 to achieve relatively high imaging quality of the optical imaging lens assembly in a microspur mode. In addition, the seventh lens E7 may be restricted to balance a spherical aberration generated by the first six lenses by a residual spherical aberration of the seventh lens E7 after balancing to further finely adjust and control a spherical aberration of the optical imaging lens assembly and strengthen the accurate control over an aberration in an on-axis field of view. Such a setting is favorable for achieving relatively high imaging quality of the optical imaging lens assembly under continuous subject distances.

In the embodiment, the effective focal length f of the optical imaging lens assembly, a curvature radius R1 of an object-side surface of the first lens and a curvature radius R8 of an image-side surface of the fourth lens satisfy 1.0<f/R1+f/R8<2.0. More specifically, the effective focal length f of the optical imaging lens assembly, the curvature radius R1 of the object-side surface of the first lens and the curvature radius R8 of the image-side surface of the fourth lens satisfy 1.3≤f/R1+f/R8≤1.8. Such a setting balance spherical aberrations generated by the first lens E1 and the fourth lens E4 and ensures high imaging quality in an on-axis field of view.

In the embodiment, the effective focal length f of the optical imaging lens assembly and a curvature radius R10 of an image-side surface of the fifth lens satisfy 0<f/R10<1.5. More specifically, the effective focal length f of the optical imaging lens assembly and the curvature radius R10 of the image-side surface of the fifth lens satisfy 0.3≤f/R10<1.5. The curvature radius R10 of the image-side surface of the fifth lens may be controlled to control a contribution of a fifth-order spherical aberration thereof well to further compensate and balance third-order spherical aberrations generated by the lenses before the fifth lens and ensure high imaging quality in the on-axis field of view.

In the embodiment, the effective focal length f of the optical imaging lens assembly, a curvature radius R3 of an object-side surface of the second lens and a curvature radius R4 of an image-side surface of the second lens satisfy 1.4≤f/(R3−R4)<3.5. More specifically, the effective focal length f of the optical imaging lens assembly, the curvature radius R3 of the object-side surface of the second lens and the curvature radius R4 of the image-side surface of the second lens satisfy 1.4≤f/(R3−R4)≤3.4. A ratio of the effective focal length f of the optical imaging lens assembly to a difference between the curvature radius R3 of the object-side surface of the second lens and the curvature radius R4 of the image-side surface of the second lens is reasonably controlled to keep an astigmatism contribution of an image-side surface of the optical imaging lens assembly in a reasonable range to balance accumulated astigmatism of the system to achieve relatively high imaging quality of the optical imaging lens in both a tangential surface and a sagittal surface.

In the embodiment, the curvature radius R11 of the object-side surface of the sixth lens, the curvature radius R12 of the image-side surface of the sixth lens and a center thickness CT6 of the sixth lens satisfy 2<(R12−R11)/CT6<4.5. More specifically, the curvature radius R11 of the object-side surface of the sixth lens, the curvature radius R12 of the image-side surface of the sixth lens and the center thickness CT6 of the sixth lens satisfy 2.1≤(R12−R11)/CT6≤4.2. Such a setting effectively controls the shape of the sixth lens E6 to make the sixth lens E6 more uniform to facilitate the machining and forming of the optical imaging lens assembly. In addition, the shape of the sixth lens E6 makes a relatively great contribution to the microspur improvement of the whole system.

In the embodiment, a center thickness CT6 of the sixth lens and a center thickness CT7 of the seventh lens satisfy 1≤CT7/CT6≤2.1. By controlling a ratio of the center thickness CT6 of the sixth lens to the center thickness CT7 of the seventh lens and controlling distortion contributions of the sixth lens E6 and the seventh lens E7 in reasonable ranges, a distortion in each field of view is finally controlled under 2%, and difficulties in post design are reduced.

In the embodiment, an air space T23 between the second lens and the third lens on the optical axis 10, an air space T45 between the fourth lens and the fifth lens on the optical axis 10 and an air space T67 between the sixth lens and the seventh lens on the optical axis 10 satisfy 0<(T67−T23)/(T67−T45)≤1.3. More specifically, the air space T23 between the second lens and the third lens on the optical axis 10, the air space T45 between the fourth lens and the fifth lens on the optical axis 10 and the air space T67 between the sixth lens and the seventh lens on the optical axis 10 satisfy 0.2≤(T67−T23)/(T67−T45)≤1.3. Such a setting may effectively balance a field curvature of the optical imaging lens assembly to ensure that the optical imaging lens assembly has a reasonable field curvature, and meanwhile, reduces the air spaces between the lenses to facilitate the machining and assembling of the lenses and improve the yield of the system.

In the embodiment, an effective focal length f1 of the first lens and a combined focal length f12 of the first lens and the second lens satisfy 0.9≤f12/f1≤1.5. A ratio of the effective focal length f1 of the first lens to the combined focal length f12 of the first lens and the second lens may be reasonably restricted to ensure reasonable refractive power of the first lens E1 and the second lens E2 and reasonably control aberration contributions of the first lens E1 and the second lens E2 to ensure reasonable aberration contributions and effectively reduce the sensitivity of the first lens E1 and the second lens E2.

In the embodiment, the effective focal length f of the optical imaging lens assembly and a combined focal length f567 from the fifth lens to the seventh lens satisfy $-0.5<f/f567<0$. More specifically, the effective focal length f of the optical imaging lens assembly and the combined focal length f567 from the fifth lens to the seventh lens satisfy $-0.45f/f567<0$. A ratio range of the effective focal length f of the optical imaging lens assembly and the combined focal length f567 from the fifth lens to the seventh lens may be restricted to ensure that the fifth lens E5, the sixth lens E6 and the seventh lens E7 are combined into an optical lens group with reasonable negative refractive power to balance an aberration generated by an optical lens group with positive refractive power in the front to ensure the imaging quality of the optical imaging lens assembly.

It is to be noted that the front in the disclosure refers to a direction of the optical imaging lens assembly close to the object side and the back refers to a direction of the optical imaging lens close to the image side.

In the embodiment, the effective focal length f of the optical imaging lens assembly and an effective focal length f4 of the fourth lens satisfy $0<f/f4<0.5$. A ratio of the effective focal length f of the optical imaging lens assembly to the effective focal length f4 of the fourth lens may be restricted in a reasonable range to balance spherical aberrations generated by previous and next lenses to further finely adjust and control the spherical aberration of the system and strengthen the accurate control over the aberration in the on-axis field of view.

In the embodiment, the effective focal length f of the optical imaging lens assembly and the effective focal length f7 of the seventh lens satisfy $-1.0<f/f7<-0.5$. More specifically, the effective focal length f of the optical imaging lens assembly and the effective focal length f7 of the seventh lens satisfy $-0.95f/f7≤-0.6$. A ratio of the effective focal length f of the optical imaging lens assembly to the effective focal length f7 of the seventh lens may be restricted in a reasonable range to balance a spherical aberration generated by the first six lenses by a residual spherical aberration of the seventh lens E7 after balancing to further finely adjust and control a spherical aberration of the optical imaging lens assembly and simultaneously strengthen the accurate control over the aberration in the on-axis field of view.

In the embodiment, an effective focal length f6 of the sixth lens and the effective focal length f7 of the seventh lens satisfy $-1.5<f6/f7<-0.5$. More specifically, the effective focal length f6 of the sixth lens and the effective focal length f7 of the seventh lens satisfy $-1.4≤f6/f7≤-0.6$. Such a setting may control the spherical aberrations generated by the sixth lens E6 and the seventh lens E7 in relatively small ranges, and ensures the clear imaging of the optical imaging lens assembly in the on-axis field of view.

In the embodiment, Yc61 is a critical point height of the object-side surface of the sixth lens closest to the optical axis 10, Yc62 is a critical point height of the image-side surface of the sixth lens closest to the optical axis 10, and Yc61 and Yc62 satisfy 1<Yc62/Yc61<1.3. More specifically, Yc61 and Yc62 satisfy 1.1≤Yc62/Yc61<1.3. A ratio of Yc61 to Yc62 is reasonably controlled to effectively ensure that the sixth lens E6 has a relatively great vector height in an intermediate aperture band and prevents an excessively large field angle of the sixth lens E6. Such a setting may ensure that the lens is convenient to machine, and meanwhile, effectively improves the microspur performance of the optical imaging lens assembly.

In the embodiment, YT61 is a vector height of a critical point of the object-side surface of the sixth lens closest to the optical axis 10, YT62 is a vector height of a critical point of the image-side surface of the sixth lens closest to the optical axis 10, and YT61 and YT62 satisfy 1≤YT62/YT61<1.2. A ratio of the vector height YT61 of the critical point of the object-side surface of the sixth lens closest to the optical axis 10 to the vector height YT62 of the critical point of the image-side surface of the sixth lens closest to the optical axis 10 is reasonably controlled, so that a shape of the sixth lens E6 is similar to the shape of W, and such a shape is favorable for improving the microspur performance and ensures that the optical imaging lens assembly has a good peak field curvature at an infinite distance and also has a relatively high imaging quality in a microspur mode.

It is to be noted that microspur is a range where a subject distance is smaller than 8 centimeters.

In the embodiment, $ET5_{max}$ is a maximum edge thickness of the fifth lens from the optical axis 10 to an inflection point of an object-side surface of the fifth lens farthest from the optical axis 10, $ET5_{min}$ is a minimum edge thickness of the fifth lens from the optical axis 10 to the inflection point of the object-side surface of the fifth lens farthest from the optical axis 10, and $ET5_{max}$ and $ET5_{min}$ satisfy $(ET5_{max}-ET5_{min})/ET5_{min}≤0.25$. More specifically, the maximum edge thickness $ET5_{max}$ of the fifth lens from the optical axis 10 to the inflection point of the object-side surface of the fifth lens farthest from the optical axis 10 and the minimum edge thickness $ET5_{min}$ of the fifth lens from the optical axis 10 to the inflection point of the object-side surface of the fifth lens farthest from the optical axis 10 satisfy $0≤(ET5_{max}-ET5_{min})/ET5_{min}≤0.25$. Such a setting ensures that the fifth lens E5 has an inflection point and is high in uniformity and convenient to machine and form, and also avoids a risk in the formation of a weld line of the fifth lens E5.

In the embodiment, an abbe number V4 of the fourth lens, an abbe number V5 of the fifth lens, an abbe number V6 of the sixth lens and an abbe number V7 of the seventh lens satisfy $0<(V4+V6+V7)/3-V5<20$. More specifically, the abbe number V4 of the fourth lens, the abbe number V5 of the fifth lens, the abbe number V6 of the sixth lens and the abbe number V7 of the seventh lens satisfy $18.3≤(V4+V6+V7)/3-V5≤18.6$. Such a setting may reasonably configure the refractive power of the fourth lens E4, the fifth lens E5, the sixth lens E6 and the seventh lens E7 to endow the optical imaging lens assembly with a relatively high chromatic aberration correction capability and ensure the imaging quality.

In the embodiment, a focusing movement distance ΔT of the optical imaging lens assembly on the optical axis 10 satisfies |ΔT|≤0.5 mm when a subject distance changes from an infinite distance to 8 centimeters. By such a setting, the optical imaging lens assembly may be driven by a motor to move on the optical axis 10 to further adjust the position of a focal surface to implement focusing when the subject distance changes. A requirement on a stroke of the motor is effectively reduced, a quick response to the focusing is ensured, and user experiences are improved.

Embodiment 2

The disclosure provides an optical imaging lens assembly, which sequentially includes from an object side to an image side along an optical axis: a first lens with a positive refractive power, a second lens with a refractive power, a third lens with a refractive power, a fourth lens with a refractive power, a fifth lens with a refractive power, a sixth lens with a positive refractive power and a seventh lens with a refractive power. Semi-FOV is a half of a maximum field of view of the optical imaging lens assembly, and an effective focal length f of the optical imaging lens assembly and Semi-FOV satisfy f*tan(Semi-FOV)≥5.0 mm. A curvature radius R11 of an object-side surface of the sixth lens, a curvature radius R12 of an image-side surface of the sixth lens and the effective focal length f of the optical imaging lens assembly satisfy 5.0<f/R11+f/R12<7.0. The effective focal length f of the optical imaging lens assembly and an effective focal length f7 of the seventh lens satisfy −1.0<f/f7<−0.5.

More specifically, the effective focal length f of the optical imaging lens assembly and Semi-FOV may satisfy 5.1 mm≤f*tan(Semi-FOV)≤5.3 mm.

More specifically, the curvature radius R11 of the object-side surface of the sixth lens, the curvature radius R12 of the image-side surface of the sixth lens and the effective focal length f of the optical imaging lens assembly may satisfy 5.3≤f/R11+f/R12≤6.2.

More specifically, the effective focal length f of the optical imaging lens assembly and the effective focal length f7 of the seventh lens satisfy −0.9≤f/f7≤−0.6.

The refractive power is configured reasonably, so that an astigmatism and a distortion may be reduced effectively, and the imaging quality of the optical imaging lens assembly may be improved greatly. The effective focal length f of the optical imaging lens assembly and Semi-FOV are configured reasonably, so that the size of the system may be effectively reduced, a deflection angle of a ray is relatively small, a large image surface is achieved, and meanwhile, difficulties in machining are reduced. The curvature radius R11 of the object-side surface of the sixth lens may be controlled to effectively control the shape of the sixth lens E6 to achieve relatively high imaging quality of the optical imaging lens assembly in a microspur mode. In addition, a ratio of the effective focal length f of the optical imaging lens assembly to the effective focal length f7 of the seventh lens may be restricted in a reasonable range to balance a spherical aberration generated by the first six lenses by a residual spherical aberration of the seventh lens E7 after balancing to further finely adjust and control a spherical aberration of the optical imaging lens assembly and simultaneously strengthen the accurate control over the aberration in an on-axis field of view.

In the embodiment, a curvature radius R13 of an object-side surface of the seventh lens, a curvature radius R14 of an image-side surface of the seventh lens and the effective focal length f7 of the seventh lens satisfy f7/(R13−R14)≤−2.0. More specifically, the curvature radius R13 of the object-side surface of the seventh lens, the curvature radius R14 of the image-side surface of the seventh lens and the effective focal length f7 of the seventh lens may satisfy −7.4≤f7/(R13−R14)≤−2.0. The seventh lens E7 may be restricted to balance a spherical aberration generated by the first six lenses by a residual spherical aberration of the seventh lens E7 after balancing to further finely adjust and control a spherical aberration of the optical imaging lens assembly and strengthen the accurate control over an aberration in the on-axis field of view. Such a setting is favorable for achieving relatively high imaging quality of the optical imaging lens assembly under continuous subject distances.

In the embodiment, the effective focal length f of the optical imaging lens assembly, a curvature radius R1 of an object-side surface of the first lens and a curvature radius R8 of an image-side surface of the fourth lens satisfy 1.0<f/R1+f/R8<2.0. More specifically, the effective focal length f of the optical imaging lens assembly, the curvature radius R1 of the object-side surface of the first lens and the curvature radius R8 of the image-side surface of the fourth lens satisfy 1.3≤f/R1+f/R8≤1.8. Such a setting balance spherical aberrations generated by the first lens E1 and the fourth lens E4 and ensures high imaging quality in an on-axis field of view.

In the embodiment, the effective focal length f of the optical imaging lens assembly and a curvature radius R10 of an image-side surface of the fifth lens satisfy 0<f/R10<1.5. More specifically, the effective focal length f of the optical imaging lens assembly and the curvature radius R10 of the image-side surface of the fifth lens satisfy 0.3≤f/R10<1.5. The curvature radius R10 of the image-side surface of the fifth lens may be controlled to control a contribution of a fifth-order spherical aberration thereof well to further compensate and balance third-order spherical aberrations generated by the lenses before the fifth lens and ensure high imaging quality in the on-axis field of view.

In the embodiment, the effective focal length f of the optical imaging lens assembly, a curvature radius R3 of an object-side surface of the second lens and a curvature radius R4 of an image-side surface of the second lens satisfy 1.4≤f/(R3−R4)<3.5. More specifically, the effective focal length f of the optical imaging lens assembly, the curvature radius R3 of the object-side surface of the second lens and the curvature radius R4 of the image-side surface of the second lens satisfy 1.4≤f/(R3−R4)≤3.4. A ratio of the effective focal length f of the optical imaging lens assembly to a difference between the curvature radius R3 of the object-side surface of the second lens and the curvature radius R4 of the image-side surface of the second lens is reasonably controlled to keep an astigmatism contribution of an image-side surface of the optical imaging lens assembly in a reasonable range to balance accumulated astigmatism of the system to achieve relatively high imaging quality of the optical imaging lens in both a tangential surface and a sagittal surface.

In the embodiment, the curvature radius R11 of the object-side surface of the sixth lens, the curvature radius R12 of the image-side surface of the sixth lens and a center thickness CT6 of the sixth lens satisfy 2<(R12−R11)/CT6<4.5. More specifically, the curvature radius R11 of the object-side surface of the sixth lens, the curvature radius R12 of the image-side surface of the sixth lens and the center thickness CT6 of the sixth lens satisfy 2.1≤(R12−R11)/CT6≤4.2. Such a setting effectively controls the shape of the sixth lens E6 to make the sixth lens E6 more uniform to facilitate the machining and forming of the optical imaging lens assembly. In addition, the shape of the sixth lens E6 makes a relatively great contribution to the microspur improvement of the whole system.

In the embodiment, a center thickness CT6 of the sixth lens and a center thickness CT7 of the seventh lens satisfy 1≤CT7/CT6≤2.1. By controlling a ratio of the center thickness CT6 of the sixth lens to the center thickness CT7 of the seventh lens, distortion contributions of the sixth lens E6 and the seventh lens E7 are controlled in reasonable ranges, so that a distortion in each field of view is finally controlled under 2%, and difficulties in post design are reduced.

In the embodiment, an air space T23 between the second lens and the third lens on the optical axis, an air space T45 between the fourth lens and the fifth lens on the optical axis and an air space T67 between the sixth lens and the seventh lens on the optical axis satisfy 0<(T67−T23)/(T67−T45) ≤1.3. More specifically, the air space T23 between the second lens and the third lens on the optical axis 10, the air space T45 between the fourth lens and the fifth lens on the optical axis 10 and the air space T67 between the sixth lens and the seventh lens on the optical axis 10 satisfy 0.2≤(T67−T23)/(T67−T45)≤1.3. Such a setting may effectively balance a field curvature of the optical imaging lens assembly to ensure that the optical imaging lens assembly has a reasonable field curvature, and meanwhile, reduces the air spaces between the lenses to facilitate the machining and assembling of the lenses and improve the yield of the system.

In the embodiment, an effective focal length f1 of the first lens and a combined focal length f12 of the first lens and the second lens satisfy 0.9≤f2/f1≤1.5. A ratio of the effective focal length f1 of the first lens to the combined focal length f12 of the first lens and the second lens may be reasonably restricted to ensure reasonable refractive power of the first lens E1 and the second lens E2 and reasonably control aberration contributions of the first lens E1 and the second lens E2 to ensure reasonable aberration contributions and effectively reduce the sensitivity of the first lens E1 and the second lens E2.

In the embodiment, the effective focal length f of the optical imaging lens assembly and a combined focal length f567 from the fifth lens to the seventh lens satisfy −0.5<f/f567<0. More specifically, the effective focal length f of the optical imaging lens assembly and the combined focal length f567 from the fifth lens to the seventh lens satisfy −0.45f/f567<0. A ratio range of the effective focal length f of the optical imaging lens assembly and the combined focal length f567 from the fifth lens to the seventh lens may be restricted to ensure that the fifth lens E5, the sixth lens E6 and the seventh lens E7 are combined into an optical lens group with a reasonable negative refractive power to balance an aberration generated by an optical lens group with a positive refractive power in the front to ensure the imaging quality of the optical imaging lens assembly.

It is to be noted that the front in the disclosure refers to a direction of the optical imaging lens assembly close to the object side and the back refers to a direction of the optical imaging lens close to the image side.

In the embodiment, the effective focal length f of the optical imaging lens assembly and an effective focal length f4 of the fourth lens satisfy 0<f/f4<0.5. A ratio of the effective focal length f of the optical imaging lens assembly to the effective focal length f4 of the fourth lens may be restricted in a reasonable range to balance spherical aberrations generated by previous and next lenses to further finely adjust and control the spherical aberration of the system and strengthen the accurate control over the aberration in the on-axis field of view.

In the embodiment, an effective focal length f6 of the sixth lens and the effective focal length f7 of the seventh lens satisfy −1.5<f6/f7<−0.5. More specifically, the effective focal length f6 of the sixth lens and the effective focal length f7 of the seventh lens satisfy −1.4≤f6/f7≤−0.6. Such a setting may control the spherical aberrations generated by the sixth lens E6 and the seventh lens E7 in relatively small ranges, and ensures the clear imaging of the optical imaging lens assembly in the on-axis field of view.

In the embodiment, Yc61 is a critical point height of the object-side surface of the sixth lens closest to the optical axis, Yc62 is a critical point height of the image-side surface of the sixth lens closest to the optical axis, and Yc61 and Yc62 satisfy 1<Yc62/Yc61<1.3. More specifically, Yc61 and Yc62 satisfy 1.1≤Yc62/Yc61<1.3. A ratio of Yc61 to Yc62 is reasonably controlled to effectively ensure that the sixth lens E6 has a relatively great vector height in an intermediate aperture band and prevents an excessively large field angle of the sixth lens E6. Such a setting may ensure that the lens is convenient to machine, and meanwhile, effectively improves the microspur performance of the optical imaging lens assembly.

In the embodiment, YT61 is a vector height of a critical point of the object-side surface of the sixth lens closest to the optical axis, YT62 is a vector height of a critical point of the image-side surface of the sixth lens closest to the optical axis, and YT61 and YT62 satisfy 1≤YT62/YT61<1.2. A ratio of the vector height YT61 of the critical point of the object-side surface of the sixth lens closest to the optical axis 10 to the vector height YT62 of the critical point of the image-side surface of the sixth lens closest to the optical axis 10 is reasonably controlled, so that a shape of the sixth lens E6 is similar to the shape of W, and such a shape is favorable for improving the microspur performance and ensures that the optical imaging lens assembly has a good peak field curvature at an infinite distance and also has a relatively high imaging quality in a microspur mode.

It is to be noted that microspur is a range where a subject distance is smaller than 8 centimeters.

In the embodiment, $ET5_{max}$ is a maximum edge thickness of the fifth lens from the optical axis to an inflection point of an object-side surface of the fifth lens farthest from the optical axis, $ET5_{min}$ is a minimum edge thickness of the fifth lens from the optical axis to the inflection point of the object-side surface of the fifth lens farthest from the optical axis, and $ET5_{max}$ and $ET5_{min}$ satisfy $(ET5_{max}-ET5_{min})/ET5_{min}≤0.25$. More specifically, the maximum edge thickness $ET5_{max}$ of the fifth lens from the optical axis 10 to the inflection point of the object-side surface of the fifth lens farthest from the optical axis 10 and the minimum edge thickness $ET5_{min}$ of the fifth lens from the optical axis 10 to the inflection point of the object-side surface of the fifth lens farthest from the optical axis 10 satisfy $0≤(ET5_{max}-ET5_{min})/ET5_{min}≤0.25$. Such a setting ensures that the fifth lens E5 has an inflection point and is high in uniformity and convenient to machine and form, and also avoids a risk in the formation of a weld line of the fifth lens E5.

In the embodiment, an abbe number V4 of the fourth lens, an abbe number V5 of the fifth lens, an abbe number V6 of the sixth lens and an abbe number V7 of the seventh lens satisfy 0<(V4+V6+V7)/3−V5<20. More specifically, the abbe number V4 of the fourth lens, the abbe number V5 of the fifth lens, the abbe number V6 of the sixth lens and the abbe number V7 of the seventh lens satisfy 18.3≤(V4+V6+V7)/3−V5≤18.6. Such a setting may reasonably configure the refractive power of the fourth lens E4, the fifth lens E5, the sixth lens E6 and the seventh lens E7 to endow the optical imaging lens assembly with a relatively high chromatic aberration correction capability and ensure the imaging quality.

In the embodiment, a focusing movement distance ΔT of the optical imaging lens assembly on the optical axis satisfies |ΔT|≤0.5 mm when a subject distance changes from an infinite distance to 8 centimeters. By such a setting, the optical imaging lens assembly may be driven by a motor to move on the optical axis 10 to further adjust the position of a focal surface to implement focusing when the subject distance changes. A requirement on a stroke of the motor is effectively reduced, a quick response to the focusing is ensured, and user experiences are improved.

The optical imaging lens assembly may further include at least one diaphragm STO, to improve the imaging quality of the lens assembly. Optionally, the diaphragm STO may be arranged before the first lens E1. Optionally, the optical imaging lens assembly may further include an optical filter E8 configured to correct the chromatic aberration and/or a protective glass configured to protect a photosensitive element on the imaging surface.

The optical imaging lens assembly in the disclosure may adopt multiple lenses, for example, the abovementioned seven. The refractive power and surface types of each lens, the center thickness of each lens, on-axis distances between the lenses and the like may be reasonably configured to effectively enlarge an aperture of the optical imaging lens assembly, reduce the sensitivity of the lens assembly, improve the machinability of the lens assembly, and ensure that the optical imaging lens assembly is more favorable for production and machining and applicable to a portable electronic device. The optical imaging lens assembly also has the advantages of large aperture, ultra-thin design, and high imaging quality, and may satisfy a miniaturization requirement of an intelligent electronic product.

In the disclosure, at least one of mirror surfaces of the lenses is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatism aberrations during imaging may be eliminated as much as possible, thereby improving the imaging quality.

However, those skilled in the art should know that the number of the lenses forming the optical imaging lens assembly may be changed without departing from the technical solutions claimed in the disclosure to achieve each result and advantage described in the specification. For example, although descriptions are made in the implementation with seven lenses as an example, the optical imaging lens assembly is not limited to seven lenses. If necessary, the optical imaging lens assembly may further include another number of lenses.

Examples of specific surface types and parameters applied to the optical imaging lens assembly of the abovementioned embodiment will further be described below with reference to the drawings.

It is to be noted that any one of following Example 1 to Example 7 is applied to all embodiments of the disclosure.

Example 1

As shown in FIGS. 1-5, an optical imaging lens assembly according to Example 1 of the disclosure is described. FIG. 1 shows a structural schematic diagram of an optical imaging lens assembly according to Example 1.

As shown in FIG. 1, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a convex surface, and an image-side surface S4 of the second lens is a concave surface. The third lens E3 has a positive refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens assembly is 5.71 mm, and a maximum field of view of the optical imaging lens assembly is 84.10°.

Table 1 shows a basic structural parameter table of the optical imaging lens assembly of Example 1, wherein the units of the curvature radius, the thickness/distance and the focal length are all millimeters (mm).

TABLE 1

| Surface number | Surface type | Curvature radius | Thickness | Material Refractive index | Abbe number | Conic coefficient |
|---|---|---|---|---|---|---|
| OBJ | Spherical | Infinite | Infinite, 80 | | | |
| STO | Spherical | Infinite | −0.4929 | | | |
| S1 | Aspheric | 2.5617 | 0.8151 | 1.546 | 55.92 | 0.0000 |
| S2 | Aspheric | 55.1553 | 0.1422 | | | 0.0000 |
| S3 | Aspheric | 8.0832 | 0.3000 | 1.677 | 19.24 | 0.0000 |
| S4 | Aspheric | 4.0449 | 0.5519 | | | 0.0000 |
| S5 | Aspheric | −63.6155 | 0.3454 | 1.667 | 20.37 | 0.0000 |
| S6 | Aspheric | −55.5287 | 0.1227 | | | 0.0000 |
| S7 | Aspheric | −13.1644 | 0.5989 | 1.546 | 55.92 | 0.0000 |
| S8 | Aspheric | −6.4403 | 0.4846 | | | 0.0000 |
| S9 | Aspheric | −10.5474 | 0.4700 | 1.570 | 37.4 | 0.0000 |
| S10 | Aspheric | 12.5361 | 0.1104 | | | 0.0000 |
| S11 | Aspheric | 1.6039 | 0.4197 | 1.537 | 55.71 | −1.0000 |

TABLE 1-continued

| Surface number | Surface type | Curvature radius | Thickness | Material Refractive index | Abbe number | Conic coefficient |
|---|---|---|---|---|---|---|
| S12 | Aspheric | 2.8276 | 0.7702 | | | −1.0000 |
| S13 | Aspheric | 3.9810 | 0.6131 | 1.537 | 55.71 | −12.0184 |
| S14 | Aspheric | 1.8336 | 0.7553 | | | −1.0000 |
| S15 | Spherical | Infinite | 0.2100 | 1.518 | 64.17 | |
| S16 | Spherical | Infinite | 0.2685, 0.6953 | | | |
| S17 | Spherical | Infinite | | | | |

In Example 1, both the object-side surface and the image-side surface of any lens in the first lens E1 to the seventh lens E7 are aspheric surfaces, and a surface type of each aspheric lens may be defined through, but not limited to, the following aspheric surface formula:

$$x = \frac{ch^2}{1 + \sqrt{1 - (k+1)c^2 h^2}} + \sum A_i h^i, \quad (1)$$

wherein x is a vector height of a distance between the aspheric surface and a vertex of the aspheric surface when the aspheric surface is located at a position with the height h along the optical axis 10; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface. Table 2 shows high-order coefficients A4, A6, A8, A10, A12, A14, A16, A18, A20, A22, A24, A26, A28 and A30 applied to the aspheric mirror surfaces S1-S14 in Example 1.

TABLE 2

| Surface number | A4 | A6 | A8 | A10 | A12 | A14 | A16 |
|---|---|---|---|---|---|---|---|
| S1 | 8.3131E−02 | −2.7704E−02 | 8.7238E−03 | −1.9076E−03 | 2.5966E−04 | 2.3202E−05 | −2.7947E−05 |
| S2 | 7.7364E−02 | −9.5111E−03 | 4.5876E−03 | 3.5284E−04 | 1.6293E−04 | 3.2921E−05 | −1.8511E−05 |
| S3 | −9.7283E−02 | 3.6205E−02 | −6.0228E−03 | 3.5476E−03 | −4.0640E−04 | 2.5181E−04 | −1.3930E−04 |
| S4 | −5.5331E−02 | 1.5991E−02 | −3.6107E−03 | 2.4932E−03 | −7.1566E−04 | 2.8107E−04 | −1.2271E−04 |
| S5 | −1.4476E−01 | −1.0055E−02 | 1.4255E−03 | 9.8608E−04 | 7.6655E−04 | 7.5243E−05 | 8.6002E−05 |
| S6 | −1.3232E−01 | −4.8302E−03 | 1.4526E−02 | −5.8063E−05 | 2.3822E−03 | −8.6758E−04 | 2.3189E−04 |
| S7 | 2.6446E−02 | 5.8202E−03 | 2.1685E−02 | −9.9213E−03 | 2.9528E−03 | −2.8505E−03 | 1.0110E−03 |
| S8 | −1.0413E−01 | 2.0207E−03 | 4.0400E−02 | −7.8300E−03 | 3.3624E−03 | −3.6825E−03 | −2.6699E−04 |
| S9 | −1.0544E−01 | −2.9277E−01 | 9.1661E−02 | 1.1694E−02 | 2.4930E−02 | −5.8007E−03 | −1.0015E−03 |
| S10 | −7.9351E−01 | 2.5893E−02 | 4.3943E−02 | 3.9945E−03 | −6.8370E−03 | −5.9177E−03 | 7.2914E−03 |
| S11 | −5.0130E+00 | 1.1016E+00 | −1.6043E−01 | −6.1409E−02 | 4.3612E−02 | 4.6640E−03 | −1.8345E−02 |
| S12 | −3.0041E+00 | 3.4113E−01 | 9.2464E−02 | −1.0992E−01 | 4.8023E−02 | 9.3626E−03 | −2.3294E−03 |
| S13 | −1.9251E+00 | 8.8686E−01 | −3.6419E−01 | 1.6431E−01 | −7.6906E−02 | 5.4627E−02 | −2.9163E−02 |
| S14 | −7.0664E+00 | 1.7580E+00 | −4.9647E−01 | 1.9497E−01 | −9.5176E−02 | 3.7663E−02 | −1.2671E−02 |

| Surface number | A18 | A20 | A22 | A24 | A26 | A28 | A30 |
|---|---|---|---|---|---|---|---|
| S1 | 2.3898E−05 | −3.3109E−06 | 0.0000E+00 | 0.0000E+00 | 0.0000E+00 | 0.0000E+00 | 0.0000E+00 |
| S2 | 1.6123E−05 | −1.8358E−05 | 0.0000E+00 | 0.0000E+00 | 0.0000E+00 | 0.0000E+00 | 0.0000E+00 |
| S3 | 6.5493E−05 | −2.3604E−05 | 0.0000E+00 | 0.0000E+00 | 0.0000E+00 | 0.0000E+00 | 0.0000E+00 |
| S4 | 6.5193E−05 | −3.4558E−05 | 0.0000E+00 | 0.0000E+00 | 0.0000E+00 | 0.0000E+00 | 0.0000E+00 |
| S5 | 2.1868E−06 | 2.6069E−06 | 0.0000E+00 | 0.0000E+00 | 0.0000E+00 | 0.0000E+00 | 0.0000E+00 |
| S6 | −4.3391E−05 | 2.6183E−05 | 0.0000E+00 | 0.0000E+00 | 0.0000E+00 | 0.0000E+00 | 0.0000E+00 |
| S7 | −3.1076E−04 | −1.1151E−04 | −9.5011E−05 | −3.1817E−05 | −3.0605E−05 | −2.8294E−05 | −1.2041E−05 |
| S8 | −3.7905E−04 | −6.8293E−05 | −2.7098E−05 | −4.3736E−06 | 3.7992E−05 | 1.7230E−05 | 1.2099E−05 |
| S9 | −2.6286E−03 | −2.3368E−04 | −5.9500E−05 | 1.4208E−04 | 2.1973E−05 | 2.2639E−05 | −3.2928E−06 |
| S10 | −1.3998E−03 | 7.1833E−04 | −3.2358E−04 | 1.6126E−04 | 1.4370E−05 | −2.5260E−05 | −7.2128E−05 |
| S11 | 5.1690E−03 | 4.9411E−03 | −3.3005E−03 | −1.4718E−03 | 1.7979E−03 | −3.4691E−04 | −6.0300E−05 |
| S12 | −1.3916E−02 | 3.4834E−03 | 5.8686E−03 | −2.1114E−03 | −2.6989E−03 | −6.6763E−04 | 1.2277E−03 |
| S13 | −1.2452E−03 | 9.9791E−03 | −2.7989E−03 | −3.9340E−03 | 1.4560E−03 | 1.8726E−03 | −1.1690E−03 |
| S14 | 1.1126E−02 | −8.3563E−03 | 8.0042E−04 | 8.4903E−04 | −6.7010E−04 | −4.3870E−05 | 3.3521E−05 |

Figure 2:
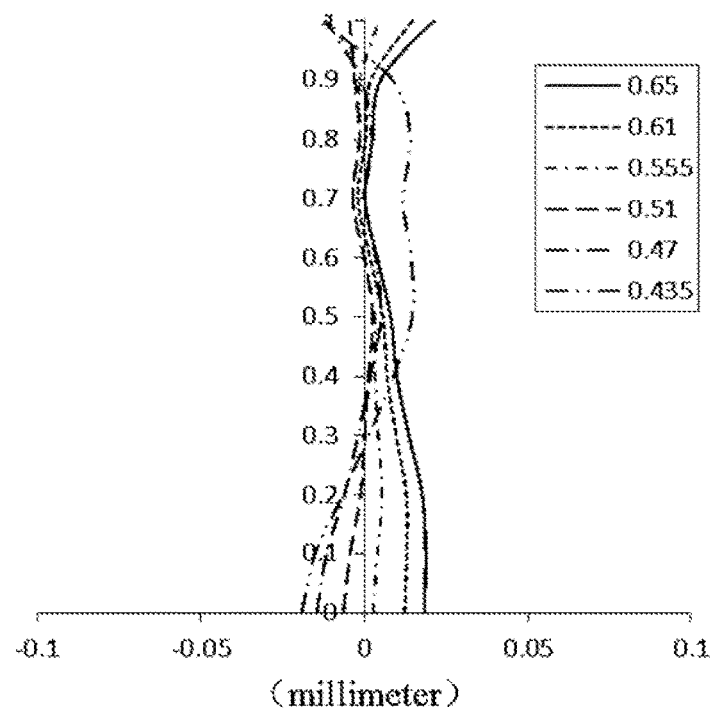
FIGS. 2-5 show a longitudinal aberration curve, an astigmatism curve, a distortion curve and a lateral color curve of the optical imaging lens assembly in FIG. 1 respectively.
Figure 3:
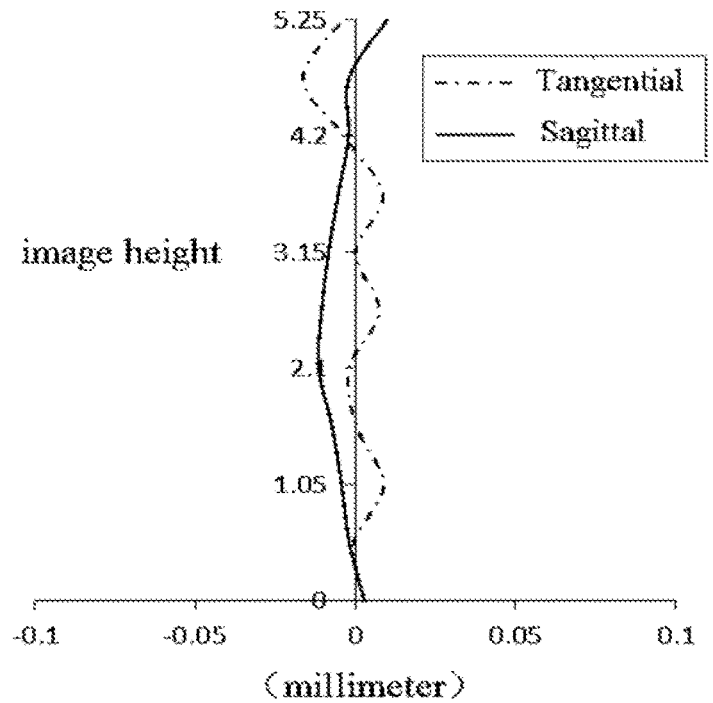
Figure 4:
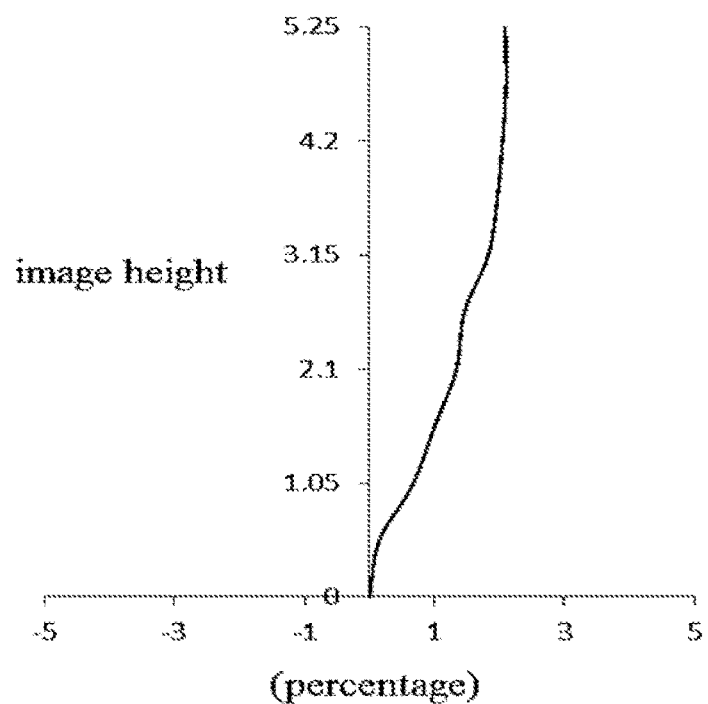
Figure 5:
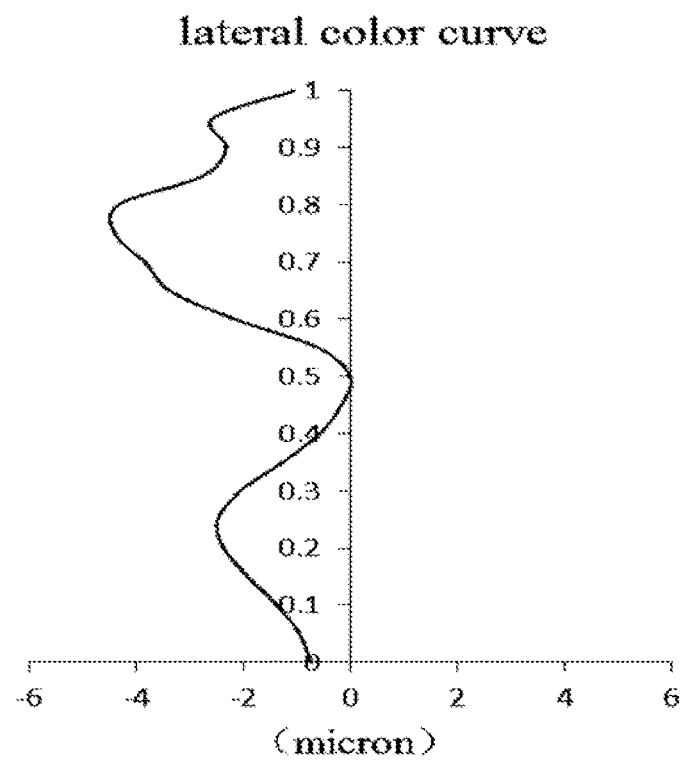

FIG. 2 shows a longitudinal aberration curve of the optical imaging lens assembly according to Example 1 to represent a deviation of a convergence focal point after light with different wavelengths passes through the optical imaging lens assembly. FIG. 3 shows an astigmatism curve of the optical imaging lens assembly according to Example 1 to represent a tangential image surface curvature and a sagittal image surface curvature. FIG. 4 shows a distortion curve of the optical imaging lens assembly according to Example 1 to represent distortion values corresponding to different fields of view. FIG. 5 shows a lateral color curve of the optical imaging lens assembly according to Example 1 to represent deviations of different image heights on the imaging surface after the light passes through the optical imaging lens assembly.

According to FIGS. 2-5, it can be seen that the optical imaging lens assembly provided in Example 1 may achieve high imaging quality.

Example 2

Figure 6:
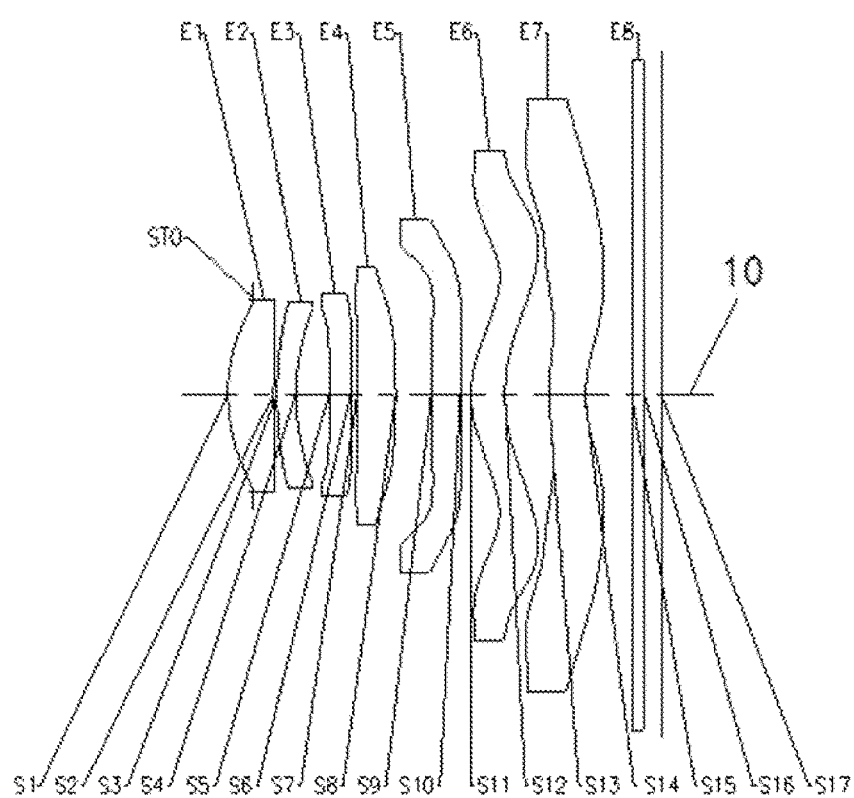
FIG. 6 shows a structural schematic diagram of an optical imaging lens assembly according to Example 2 of the disclosure.

As shown in FIGS. 6-10, an optical imaging lens assembly according to Example 2 of the disclosure is described. In the example and the following examples, parts of descriptions similar to those in Example 1 are omitted for simplicity. FIG. 6 shows a structural schematic diagram of an optical imaging lens assembly according to Example 2.

As shown in FIG. 6, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a convex surface, and an image-side surface S6 of the third lens is a concave surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a convex surface, and an image-side surface S10 of the fifth lens is a concave surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens assembly is 5.52 mm, and a maximum field of view of the optical imaging lens assembly is 86.8°.

Table 3 shows a basic structural parameter table of the optical imaging lens assembly of Example 2, wherein the units of the curvature radius, the thickness/distance and the focal length are all millimeters (mm).

TABLE 3

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.4184 | | | |
| S1 | Aspheric | 2.5612 | 0.7373 | 1.546 | 56.14 | 0.0000 |
| S2 | Aspheric | 13.3353 | 0.0564 | | | 0.0000 |
| S3 | Aspheric | 4.9772 | 0.3000 | 1.677 | 19.24 | 0.0000 |
| S4 | Aspheric | 3.3153 | 0.5391 | | | 0.0000 |
| S5 | Aspheric | 41.7545 | 0.3457 | 1.677 | 19.24 | 0.0000 |
| S6 | Aspheric | 10.9495 | 0.1053 | | | 0.0000 |
| S7 | Aspheric | 17.3927 | 0.6260 | 1.546 | 56.14 | 0.0000 |
| S8 | Aspheric | −14.6394 | 0.5755 | | | 0.0000 |
| S9 | Aspheric | 51.0892 | 0.4700 | 1.570 | 37.4 | 0.0000 |
| S10 | Aspheric | 5.8242 | 0.1728 | | | 0.0000 |
| S11 | Aspheric | 1.6124 | 0.5492 | 1.546 | 56.14 | −1.0000 |
| S12 | Aspheric | 2.8603 | 0.7081 | | | −1.0000 |
| S13 | Aspheric | 2.8040 | 0.5800 | 1.537 | 55.71 | −1.0000 |
| S14 | Aspheric | 1.6215 | 0.7547 | | | −1.0002 |
| S15 | Spherical | Infinite | 0.2100 | 1.518 | 64.17 | |
| S16 | Spherical | Infinite | 0.2698 | | | |
| S17 | Spherical | Infinite | | | | |

Table 4 shows high-order coefficients applied to each aspheric mirror surface in Example 2. A surface type of each aspheric surface may be defined by formula (1) given in Example 1.

TABLE 4

| Surface number | A4 | A6 | A8 | A10 | A12 | A14 | A16 |
|---|---|---|---|---|---|---|---|
| S1  | −3.2521E−02 | −8.8190E−03 | −2.0188E−03 | −3.4292E−04 | −4.8068E−05 | 5.3696E−06  | −2.3957E−06 |
| S2  | −7.8752E−02 | 6.5784E−03  | −4.3917E−03 | 1.0949E−03  | −3.7096E−04 | 1.0106E−04  | −3.1226E−05 |
| S3  | −4.2262E−02 | 2.1284E−02  | −1.8852E−03 | 1.5703E−03  | −2.0560E−04 | 1.0013E−04  | −1.2480E−05 |
| S4  | −2.0864E−02 | 4.4993E−03  | −5.1345E−04 | 5.7910E−04  | 1.3777E−04  | 8.3178E−05  | 3.1470E−05  |
| S5  | −1.2534E−01 | −1.0091E−02 | −9.4947E−04 | 7.2828E−04  | 3.1382E−04  | 1.3021E−04  | 4.0154E−05  |
| S6  | −1.8146E−01 | 1.0324E−02  | 6.2777E−03  | 3.0105E−03  | 4.0958E−04  | 3.2467E−05  | 2.7688E−05  |
| S7  | −1.4651E−01 | 5.1129E−02  | 6.4348E−03  | −3.9222E−03 | −1.5882E−03 | 1.0865E−04  | 2.0191E−04  |
| S8  | −2.3228E−01 | 4.5692E−02  | 2.3478E−02  | −1.7536E−03 | −2.3817E−03 | −1.4068E−03 | −6.6866E−04 |
| S9  | −4.3141E−01 | −1.7247E−01 | 2.4184E−02  | 2.6076E−02  | 7.3134E−03  | 1.4854E−03  | −1.2176E−03 |
| S10 | −1.3163E+00 | 1.6379E−01  | −2.7718E−02 | 3.7663E−02  | −2.5485E−02 | 6.0586E−03  | 5.7454E−04  |
| S11 | −4.7724E+00 | 9.8803E−01  | −9.9308E−02 | −4.9172E−02 | 1.9508E−02  | 1.6574E−02  | −1.6499E−02 |
| S12 | −2.8872E+00 | 2.2377E−01  | 1.8905E−01  | −6.0099E−02 | 3.9342E−03  | −6.7656E−03 | 2.0535E−02  |
| S13 | −4.5868E+00 | 1.3352E+00  | −4.3156E−01 | 1.9597E−01  | −1.3917E−01 | 7.6185E−02  | −1.6470E−02 |
| S14 | −8.2368E+00 | 1.9736E+00  | −6.4362E−01 | 2.5624E−01  | −1.2819E−01 | 4.1093E−02  | −1.9421E−02 |

| Surface number | A18 | A20 | A22 | A24 | A26 | A28 | A30 |
|---|---|---|---|---|---|---|---|
| S1  | 9.9447E−07  | −2.4559E−06 | 0.0000E+00  | 0.0000E+00  | 0.0000E+00  | 0.0000E+00  | 0.0000E+00  |
| S2  | 4.4006E−06  | −1.3665E−06 | 0.0000E+00  | 0.0000E+00  | 0.0000E+00  | 0.0000E+00  | 0.0000E+00  |
| S3  | 4.6196E−06  | 1.2480E−06  | 0.0000E+00  | 0.0000E+00  | 0.0000E+00  | 0.0000E+00  | 0.0000E+00  |
| S4  | 1.0344E−05  | 3.0878E−06  | 0.0000E+00  | 0.0000E+00  | 0.0000E+00  | 0.0000E+00  | 0.0000E+00  |
| S5  | 1.4360E−05  | 7.0018E−06  | 0.0000E+00  | 0.0000E+00  | 0.0000E+00  | 0.0000E+00  | 0.0000E+00  |
| S6  | 4.5150E−05  | 2.3398E−05  | 0.0000E+00  | 0.0000E+00  | 0.0000E+00  | 0.0000E+00  | 0.0000E+00  |
| S7  | −8.1402E−05 | −1.0943E−04 | 9.7471E−06  | 3.7231E−05  | 1.1294E−05  | −5.1026E−06 | 1.5770E−06  |
| S8  | −2.2951E−04 | −8.3786E−05 | 6.9847E−06  | 4.6786E−05  | 5.5789E−05  | 3.2997E−05  | 1.0096E−05  |
| S9  | −1.4050E−03 | −9.8080E−04 | −3.9984E−04 | −7.0028E−05 | 3.6196E−05  | 2.1915E−05  | −2.0254E−06 |
| S10 | 3.4746E−03  | −4.0048E−04 | −4.6549E−05 | 9.5407E−05  | −1.1876E−06 | −5.1926E−05 | −4.2856E−05 |
| S11 | 1.3259E−03  | 4.1370E−03  | −8.3093E−04 | −6.1033E−04 | 1.0287E−04  | 1.9117E−05  | −3.1653E−05 |
| S12 | −9.9522E−03 | −4.7364E−03 | −1.2703E−04 | 4.0356E−03  | −2.1641E−04 | −3.3586E−04 | −2.5036E−04 |
| S13 | −1.3104E−02 | 9.5777E−03  | 1.6706E−03  | −3.0188E−03 | −4.6575E−04 | 1.1912E−03  | −3.5724E−04 |
| S14 | 1.2019E−02  | −5.2237E−03 | 1.4554E−03  | −5.9744E−04 | 1.5538E−04  | 7.4167E−05  | −1.8283E−04 |

Figure 7:
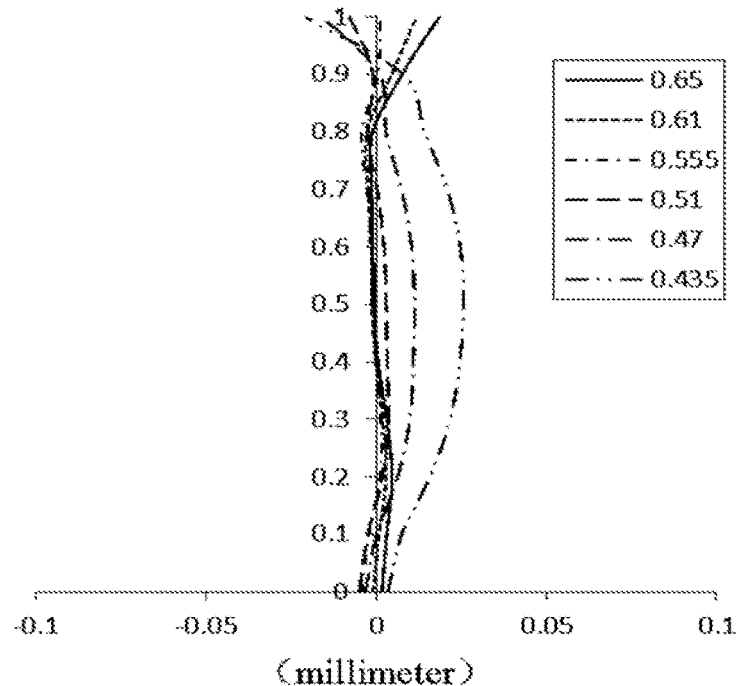
FIGS. 7-10 show a longitudinal aberration curve, an astigmatism curve, a distortion curve and a lateral color curve of the optical imaging lens assembly in FIG. 6 respectively.
Figure 8:
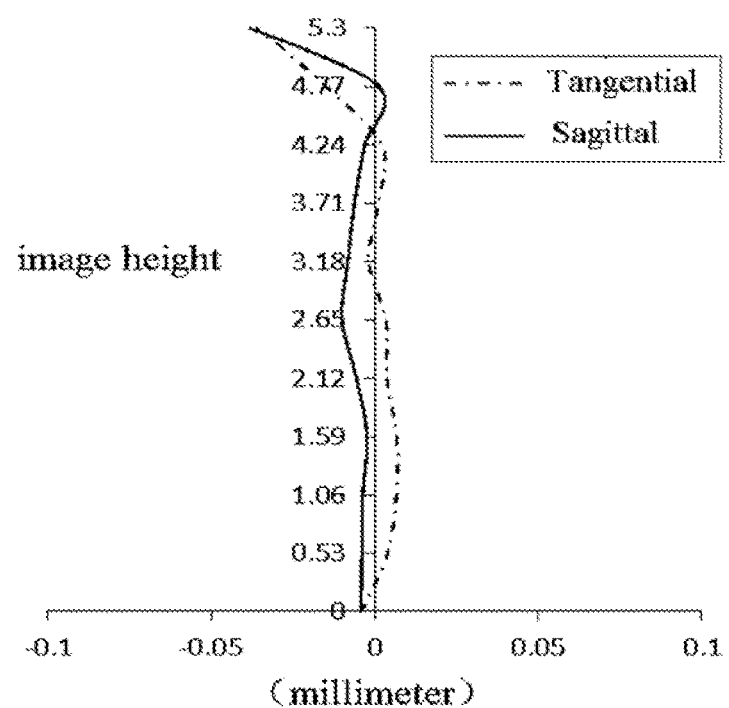
Figure 9:
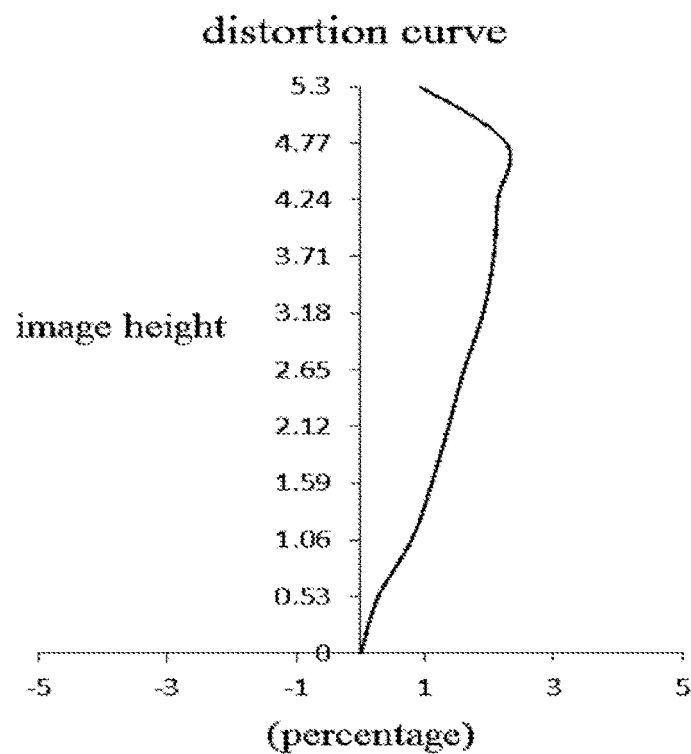
Figure 10:
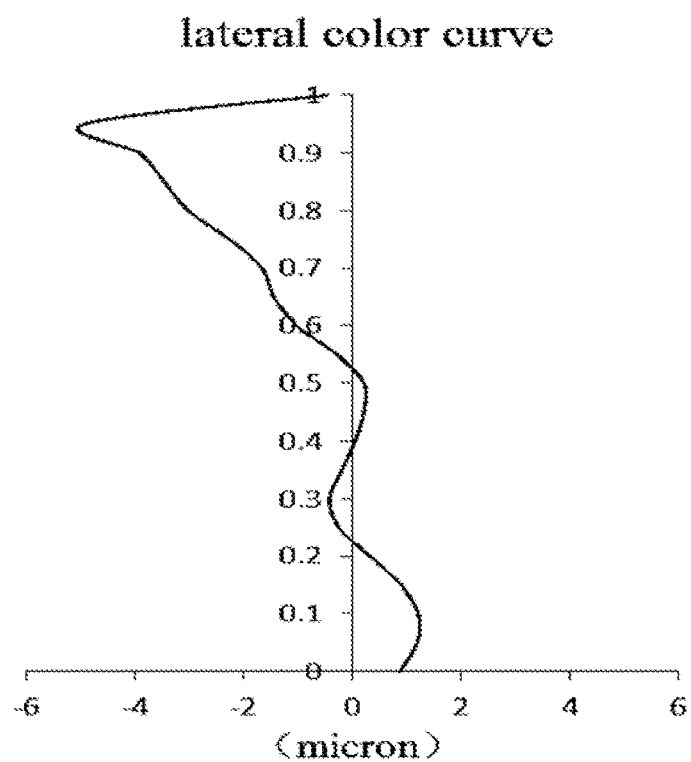

FIG. 7 shows a longitudinal aberration curve of the optical imaging lens assembly according to Example 2 to represent a deviation of a convergence focal point after light with different wavelengths passes through the optical imaging lens assembly. FIG. 8 shows an astigmatism curve of the optical imaging lens assembly according to Example 2 to represent a tangential image surface curvature and a sagittal image surface curvature. FIG. 9 shows a distortion curve of the optical imaging lens assembly according to Example 2 to represent distortion values corresponding to different fields of view. FIG. 10 shows a lateral color curve of the optical imaging lens assembly according to Example 2 to represent deviations of different image heights on the imaging surface after the light passes through the optical imaging lens assembly.

According to FIGS. 7-10, it can be seen that the optical imaging lens assembly provided in Example 2 may achieve high imaging quality.

Example 3

Figure 11:
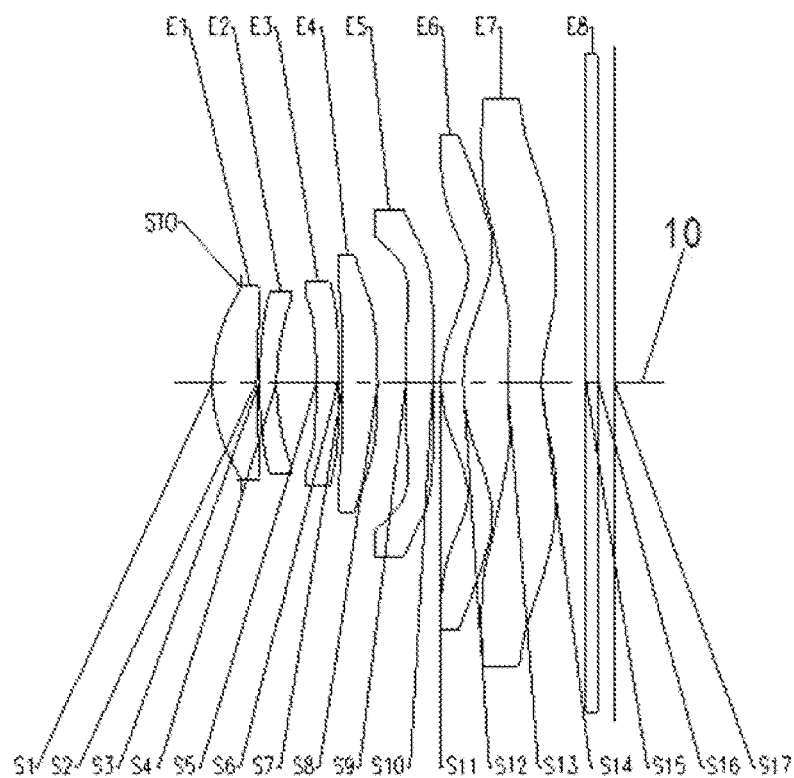
FIG. 11 shows a structural schematic diagram of an optical imaging lens assembly according to Example 3 of the disclosure.

As shown in FIGS. 11-15, an optical imaging lens assembly according to Example 3 of the disclosure is described. In the example and the following examples, parts of descriptions similar to those in Example 1 are omitted for simplicity. FIG. 11 shows a structural schematic diagram of an optical imaging lens assembly according to Example 3.

As shown in FIG. 11, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E1, an optical filter E8 and an imaging surface S17.

The first lens E1 has a positive refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a negative refractive power, an object-side surface S5 of the third lens is a concave surface, and an image-side surface S6 of the third lens is a concave surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens assembly is 5.64 mm, and a maximum field of view of the optical imaging lens assembly is 85.3°.

Table 5 shows a basic structural parameter table of the optical imaging lens assembly of Example 3, wherein the units of the curvature radius, the thickness/distance and the focal length are all millimeters (mm).

TABLE 5

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.4932 | | | |
| S1 | Aspheric | 2.5290 | 0.7686 | 1.546 | 55.92 | 0.0000 |
| S2 | Aspheric | 24.2598 | 0.0450 | | | 0.0000 |
| S3 | Aspheric | 5.5182 | 0.3000 | 1.677 | 19.24 | 0.0000 |
| S4 | Aspheric | 3.4977 | 0.6817 | | | 0.0000 |
| S5 | Aspheric | −22.7251 | 0.3791 | 1.667 | 20.37 | 0.0000 |
| S6 | Aspheric | 35.5553 | 0.0848 | | | 0.0000 |
| S7 | Aspheric | 350.0795 | 0.6090 | 1.546 | 55.92 | 0.0000 |
| S8 | Aspheric | −9.0816 | 0.4870 | | | 0.0000 |
| S9 | Aspheric | −1158.8949 | 0.4700 | 1.570 | 37.4 | 0.0000 |
| S10 | Aspheric | 8.0696 | 0.1414 | | | 0.0000 |
| S11 | Aspheric | 1.5965 | 0.3873 | 1.537 | 55.71 | −1.0000 |
| S12 | Aspheric | 2.9801 | 0.7719 | | | −1.0000 |
| S13 | Aspheric | 4.0826 | 0.5900 | 1.537 | 55.71 | −14.4762 |
| S14 | Aspheric | 1.7690 | 0.7696 | | | −1.0000 |
| S15 | Spherical | Infinite | 0.2100 | 1.518 | 64.17 | |
| S16 | Spherical | Infinite | 0.2835 | | | |
| S17 | Spherical | Infinite | | | | |

Table 6 shows high-order coefficients applied to each aspheric mirror surface in Example 3. A surface type of each aspheric surface may be defined by formula (1) given in Example 1.

TABLE 6

| Surface number | A4 | A6 | A8 | A10 | A12 | A14 | A16 |
|---|---|---|---|---|---|---|---|
| S1 | 8.0582E−02 | −3.1044E−02 | 1.0762E−02 | −2.3572E−03 | 1.6275E−04 | 1.4970E−04 | −8.2557E−05 |
| S2 | 8.8202E−02 | −2.5891E−03 | 9.7316E−03 | 5.4182E−03 | 1.3528E−03 | 1.0790E−03 | −1.6852E−04 |
| S3 | −7.8703E−02 | 4.6024E−02 | −4.2757E−03 | 7.4482E−03 | 5.6736E−04 | 5.1243E−04 | −5.5698E−05 |
| S4 | −6.1651E−02 | 2.2040E−02 | −6.4468E−03 | 3.8091E−03 | −1.0373E−03 | 3.7401E−04 | −1.4827E−04 |
| S5 | −1.3946E−01 | −7.0059E−03 | 8.7011E−04 | 1.4256E−03 | 6.2603E−04 | 1.4074E−04 | 3.6290E−05 |
| S6 | −1.9273E−01 | 1.0775E−02 | 8.2413E−03 | 2.5724E−03 | 1.7246E−03 | −5.4853E−04 | 2.5427E−05 |
| S7 | −1.1153E−01 | 4.4496E−02 | 8.6630E−03 | −4.4037E−03 | 4.4659E−05 | −2.2308E−03 | 4.9476E−04 |
| S8 | −2.2871E−01 | 4.5780E−02 | 2.6768E−02 | −5.5657E−03 | −2.1008E−03 | −3.4932E−03 | −1.2709E−03 |
| S9 | −3.9822E−01 | −2.1342E−01 | 3.8983E−02 | 2.7230E−02 | 1.3769E−02 | 1.2037E−04 | −1.6062E−03 |
| S10 | −1.1235E+00 | 1.3585E−01 | −1.2287E−02 | 3.7933E−02 | −2.3883E−02 | 3.1302E−03 | 1.9238E−03 |
| S11 | −5.1136E+00 | 1.1195E+00 | −1.6102E−01 | −6.9554E−02 | 5.6047E−02 | −8.2093E−03 | −1.6220E−02 |
| S12 | −2.9229E+00 | 2.8522E−01 | 1.1638E−01 | −1.3590E−01 | 7.7575E−02 | −1.3527E−02 | 4.0428E−03 |
| S13 | −1.9280E+00 | 8.7192E−01 | −3.7352E−01 | 1.6553E−01 | −7.6894E−02 | 5.8386E−02 | −3.0428E−02 |
| S14 | −7.3492E+00 | 1.7961E+00 | −5.4045E−01 | 2.1029E−01 | −1.0482E−01 | 4.6289E−02 | −1.4944E−02 |

| Surface number | A18 | A20 | A22 | A24 | A26 | A28 | A30 |
|---|---|---|---|---|---|---|---|
| S1 | 2.5583E−05 | −5.6063E−06 | 0.0000E+00 | 0.0000E+00 | 0.0000E+00 | 0.0000E+00 | 0.0000E+00 |
| S2 | 2.3859E−04 | −1.1289E−04 | 0.0000E+00 | 0.0000E+00 | 0.0000E+00 | 0.0000E+00 | 0.0000E+00 |
| S3 | 4.8911E−05 | −5.4018E−05 | 0.0000E+00 | 0.0000E+00 | 0.0000E+00 | 0.0000E+00 | 0.0000E+00 |
| S4 | 3.3866E−05 | −2.8536E−05 | 0.0000E+00 | 0.0000E+00 | 0.0000E+00 | 0.0000E+00 | 0.0000E+00 |
| S5 | −3.1478E−06 | −8.9838E−06 | 0.0000E+00 | 0.0000E+00 | 0.0000E+00 | 0.0000E+00 | 0.0000E+00 |
| S6 | 1.7681E−05 | 9.3698E−06 | 0.0000E+00 | 0.0000E+00 | 0.0000E+00 | 0.0000E+00 | 0.0000E+00 |
| S7 | −1.3665E−04 | −2.8940E−04 | −1.5487E−04 | −6.7609E−05 | −4.6442E−05 | −3.0553E−05 | −1.0736E−05 |
| S8 | −3.6070E−04 | −1.2689E−04 | 1.7390E−06 | 4.0554E−05 | 7.3335E−05 | 4.3650E−05 | 1.9153E−05 |
| S9 | −1.2212E−03 | −5.6686E−04 | 1.4321E−05 | 4.7778E−05 | 6.5270E−05 | −6.2936E−06 | −9.6367E−06 |
| S10 | 8.0534E−04 | −1.4529E−04 | 4.8682E−04 | 2.5730E−04 | 4.1823E−05 | −1.6888E−04 | −8.7968E−05 |
| S11 | 9.3654E−03 | 4.1641E−03 | −4.9895E−03 | 1.5871E−04 | 1.5786E−03 | −5.7205E−04 | −1.7354E−04 |
| S12 | −2.0491E−02 | 7.1986E−03 | 2.7843E−03 | −3.0608E−04 | −3.2743E−03 | 4.1488E−04 | 8.0601E−04 |
| S13 | −2.8212E−03 | 1.0561E−02 | −3.9342E−03 | −3.4973E−03 | 1.6947E−03 | 1.7880E−03 | −1.3678E−03 |
| S14 | 1.1592E−02 | −7.4295E−03 | 1.6395E−03 | 1.1752E−04 | −8.9935E−04 | 1.4608E−04 | 1.0427E−04 |

Figure 12:
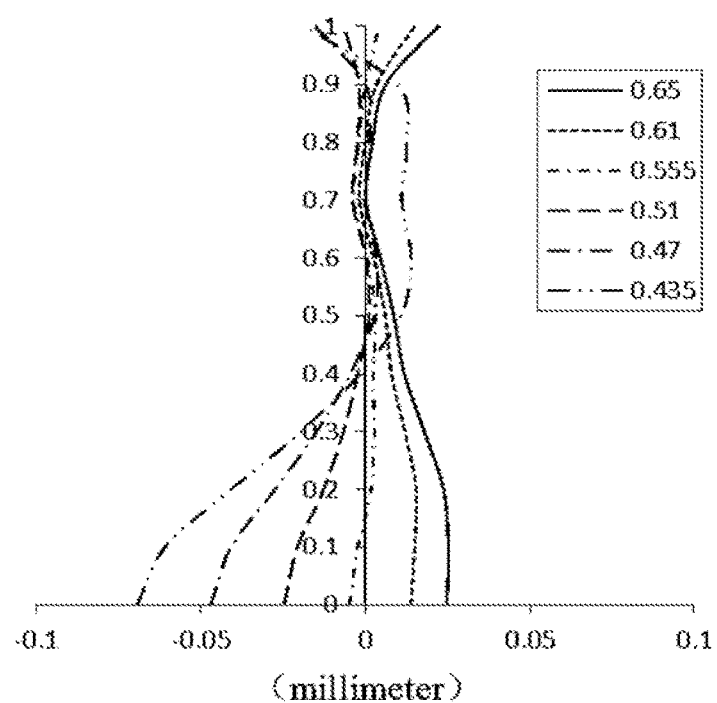
FIGS. 12-15 show a longitudinal aberration curve, an astigmatism curve, a distortion curve and a lateral color curve of the optical imaging lens assembly in FIG. 11 respectively.
Figure 13:
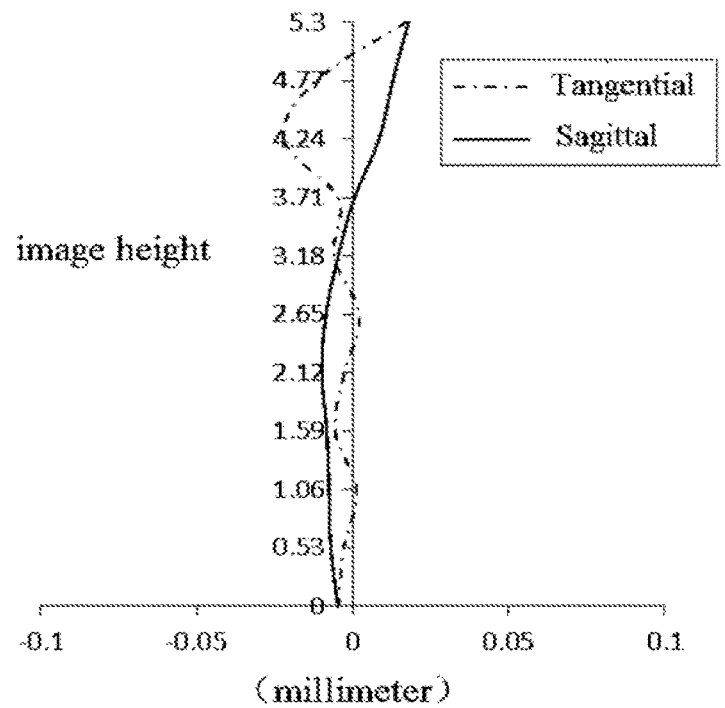
Figure 14:
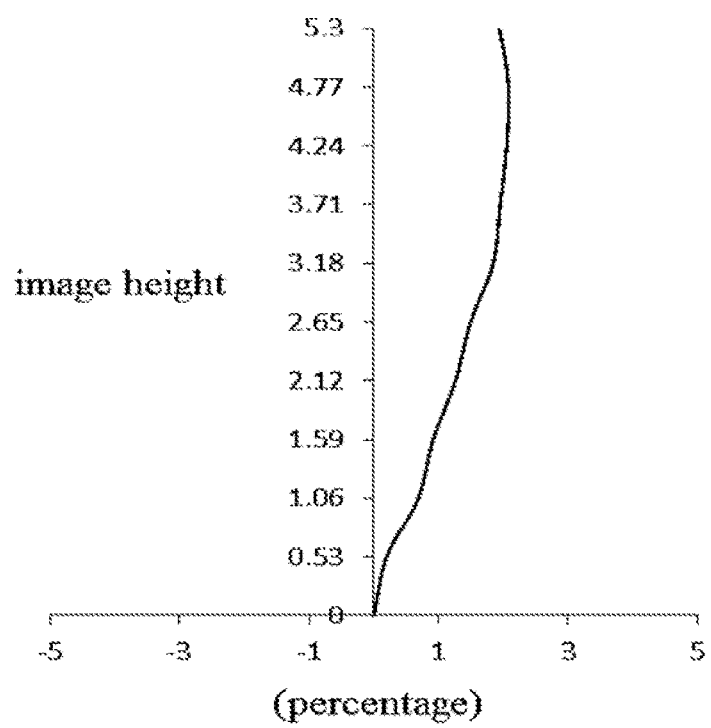
Figure 15:
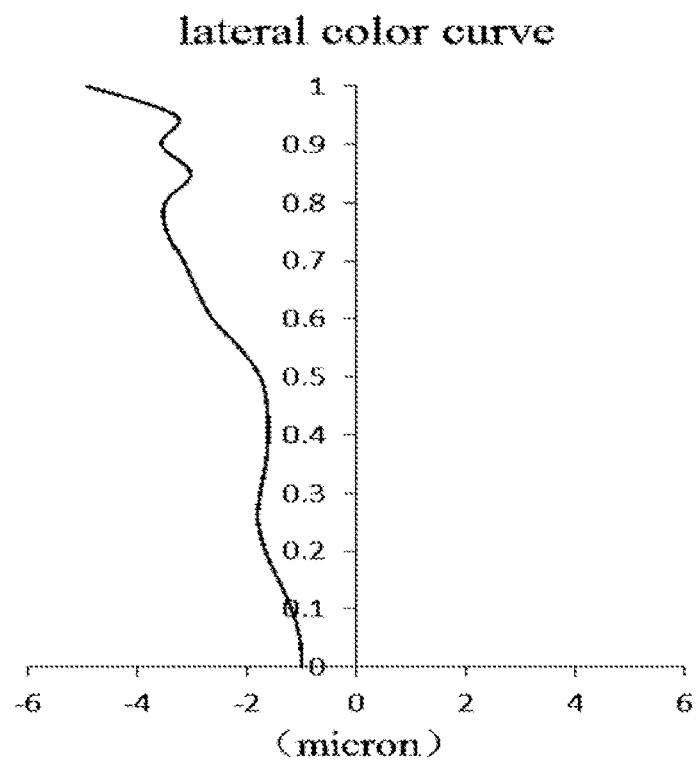

FIG. 12 shows a longitudinal aberration curve of the optical imaging lens assembly according to Example 3 to represent a deviation of a convergence focal point after light with different wavelengths passes through the optical imaging lens assembly. FIG. 13 shows an astigmatism curve of the optical imaging lens assembly according to Example 3 to represent a tangential image surface curvature and a sagittal image surface curvature. FIG. 14 shows a distortion curve of the optical imaging lens assembly according to Example 3 to represent distortion values corresponding to different fields of view. FIG. 15 shows a lateral color curve of the optical imaging lens assembly according to Example 3 to represent deviations of different image heights on the imaging surface after the light passes through the optical imaging lens assembly.

According to FIGS. 12-15, it can be seen that the optical imaging lens assembly provided in Example 3 may achieve high imaging quality.

Example 4

Figure 16:
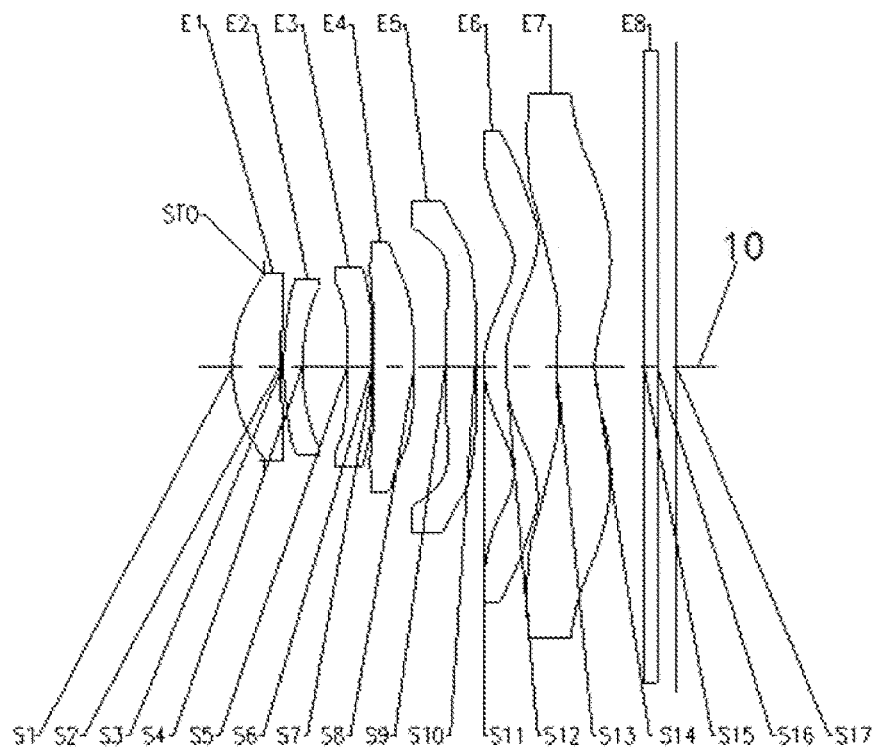
FIG. 16 shows a structural schematic diagram of an optical imaging lens assembly according to Example 4 of the disclosure.

As shown in FIGS. 16-20, an optical imaging lens assembly according to Example 4 of the disclosure is described. In the example and the following examples, parts of descriptions similar to those in Example 1 are omitted for simplicity. FIG. 16 shows a structural schematic diagram of an optical imaging lens assembly according to Example 4.

As shown in FIG. 16, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a negative refractive power, an object-side surface S9 of the fifth lens is a convex surface, and an image-side surface S10 of the fifth lens is a concave surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens assembly is 5.65 mm, and a maximum field of view of the optical imaging lens assembly is 85.3°.

Table 7 shows a basic structural parameter table of the optical imaging lens assembly of Example 4, wherein the units of the curvature radius, the thickness/distance and the focal length are all millimeters (mm).

TABLE 7

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.4924 | | | |
| S1 | Aspheric | 2.5363 | 0.7478 | 1.546 | 55.92 | 0.0000 |
| S2 | Aspheric | 25.3244 | 0.0450 | | | 0.0000 |
| S3 | Aspheric | 5.2086 | 0.3000 | 1.677 | 19.24 | 0.0000 |
| S4 | Aspheric | 3.3165 | 0.7140 | | | 0.0000 |
| S5 | Aspheric | −15.4920 | 0.3857 | 1.667 | 20.37 | 0.0000 |
| S6 | Aspheric | −15.2909 | 0.0323 | | | 0.0000 |
| S7 | Aspheric | −11.2687 | 0.6351 | 1.546 | 55.92 | 0.0000 |
| S8 | Aspheric | −9.6568 | 0.4900 | | | 0.0000 |
| S9 | Aspheric | 82.2978 | 0.4700 | 1.570 | 37.4 | 0.0000 |
| S10 | Aspheric | 8.0110 | 0.1337 | | | 0.0000 |
| S11 | Aspheric | 1.5931 | 0.3434 | 1.537 | 55.71 | −1.0000 |
| S12 | Aspheric | 3.0250 | 0.7994 | | | −1.0000 |
| S13 | Aspheric | 3.9673 | 0.5900 | 1.537 | 55.71 | −14.5886 |
| S14 | Aspheric | 1.7260 | 0.7844 | | | −1.0000 |
| S15 | Spherical | Infinite | 0.2100 | 1.518 | 64.17 | |
| S16 | Spherical | Infinite | 0.2993 | | | |
| S17 | Spherical | Infinite | | | | |

Table 8 shows high-order coefficients applied to each aspheric mirror surface in Example 4. A surface type of each aspheric surface may be defined by formula (1) given in Example 1.

TABLE 8

| Surface number | A4 | A6 | A8 | A10 | A12 | A14 | A16 |
|---|---|---|---|---|---|---|---|
| S1 | 8.0496E−02 | −3.1300E−02 | 1.0769E−02 | −2.3503E−03 | 1.6830E−04 | 1.4620E−04 | −8.5720E−05 |
| S2 | 8.7957E−02 | −2.6262E−03 | 9.6579E−03 | 5.5999E−03 | 1.1161E−03 | 1.4093E−03 | −2.4035E−04 |
| S3 | −7.4936E−02 | 4.8025E−02 | −4.6186E−03 | 7.5070E−03 | 3.7402E−04 | 7.6604E−04 | −1.3830E−04 |
| S4 | −5.9465E−02 | 2.3390E−02 | −6.5803E−03 | 3.6394E−03 | −1.0192E−03 | 3.7140E−04 | −1.5497E−04 |
| S5 | −1.2744E−01 | −1.0067E−02 | 1.8875E−03 | 1.4798E−03 | 8.0927E−04 | 1.2319E−04 | 5.4434E−05 |
| S6 | −5.6052E−02 | −2.3904E−02 | 2.2049E−02 | −3.9346E−03 | 5.5116E−03 | −2.6674E−03 | 8.0807E−04 |
| S7 | 1.0313E−01 | −4.7503E−03 | 2.7503E−02 | −1.5500E−02 | 6.1380E−03 | −5.8792E−03 | 2.7794E−03 |
| S8 | −2.2974E−01 | 4.6516E−02 | 2.7814E−02 | −9.1234E−03 | −2.5328E−03 | −4.6384E−03 | −1.0596E−03 |
| S9 | −4.2431E−01 | −2.1381E−01 | 3.3948E−02 | 2.2987E−02 | 1.6266E−02 | −1.2400E−03 | −1.0917E−03 |
| S10 | −1.1269E+00 | 1.4988E−01 | −1.9617E−02 | 3.8355E−02 | −2.0916E−02 | −4.9062E−04 | 3.4554E−03 |
| S11 | −5.1470E+00 | 1.1271E+00 | −1.6300E−01 | −6.9896E−02 | 5.7039E−02 | −1.3322E−02 | −1.3556E−02 |
| S12 | −2.8314E+00 | 2.5062E−01 | 1.2245E−01 | −1.4189E−01 | 8.3149E−02 | −1.6573E−02 | −3.1806E−05 |
| S13 | −1.9348E+00 | 8.8202E−01 | −3.8656E−01 | 1.7275E−01 | −7.7813E−02 | 6.0599E−02 | −3.4000E−02 |
| S14 | −7.4856E+00 | 1.8307E+00 | −5.4451E−01 | 2.1303E−01 | −1.0826E−01 | 4.8597E−02 | −1.4775E−02 |

| Surface number | A18 | A20 | A22 | A24 | A26 | A28 | A30 |
|---|---|---|---|---|---|---|---|
| S1 | 3.1911E−05 | −7.9613E−06 | 0.0000E+00 | 0.0000E+00 | 0.0000E+00 | 0.0000E+00 | 0.0000E+00 |
| S2 | 3.3314E−04 | −1.1864E−04 | 0.0000E+00 | 0.0000E+00 | 0.0000E+00 | 0.0000E+00 | 0.0000E+00 |
| S3 | 1.3033E−04 | −7.4446E−05 | 0.0000E+00 | 0.0000E+00 | 0.0000E+00 | 0.0000E+00 | 0.0000E+00 |
| S4 | 3.9808E−05 | −3.0776E−05 | 0.0000E+00 | 0.0000E+00 | 0.0000E+00 | 0.0000E+00 | 0.0000E+00 |
| S5 | −1.5013E−05 | −1.5185E−05 | 0.0000E+00 | 0.0000E+00 | 0.0000E+00 | 0.0000E+00 | 0.0000E+00 |
| S6 | −8.5699E−05 | 2.2412E−05 | 0.0000E+00 | 0.0000E+00 | 0.0000E+00 | 0.0000E+00 | 0.0000E+00 |
| S7 | −1.0772E−03 | −1.7718E−04 | −1.1461E−04 | −6.6746E−05 | −7.4590E−05 | −3.6755E−05 | −1.8495E−05 |
| S8 | −4.3371E−04 | −6.1053E−05 | 4.2348E−05 | 7.4655E−05 | 6.8058E−05 | 3.7479E−05 | 8.7719E−06 |
| S9 | −1.0656E−03 | −3.8975E−04 | 1.5638E−05 | 6.7820E−05 | 4.2751E−05 | −8.2558E−06 | −1.1078E−05 |
| S10 | 8.5920E−04 | −1.0247E−04 | 5.5664E−04 | 2.1701E−04 | −5.7221E−05 | −1.4296E−04 | −6.9092E−05 |
| S11 | 1.0805E−02 | 2.1386E−03 | −4.0735E−03 | 2.0090E−05 | 1.5882E−03 | −5.7612E−04 | −1.9331E−04 |
| S12 | −1.9085E−02 | 6.6056E−03 | 4.2977E−03 | −1.5761E−03 | −2.8167E−03 | 3.5592E−04 | 8.5513E−04 |
| S13 | −1.6183E−03 | 1.0718E−02 | −4.6840E−03 | −3.5350E−03 | 2.2844E−03 | 1.6506E−03 | −1.5046E−03 |
| S14 | 1.1843E−02 | −8.4384E−03 | 1.8250E−03 | −3.6618E−04 | −7.6561E−04 | 1.4507E−04 | 4.8741E−05 |

Figure 17:
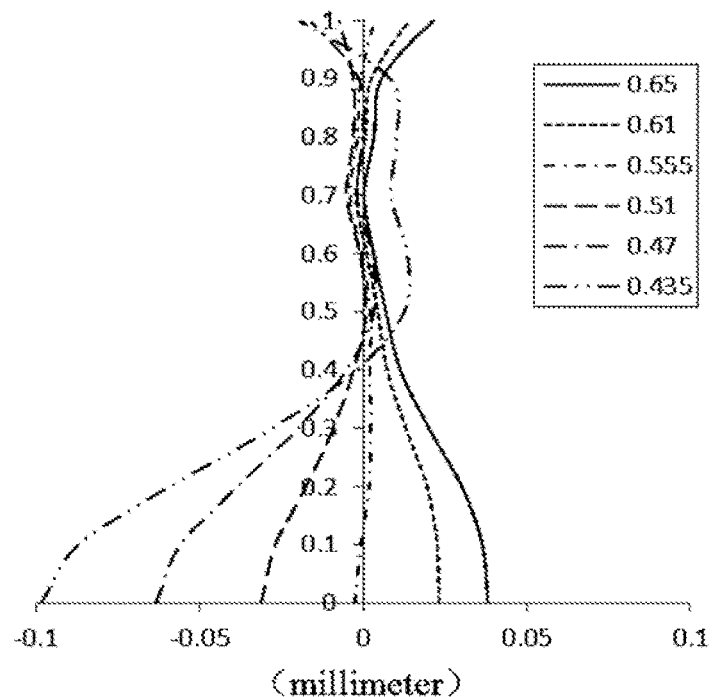
FIGS. 17-20 show a longitudinal aberration curve, an astigmatism curve, a distortion curve and a lateral color curve of the optical imaging lens assembly in FIG. 16 respectively.
Figure 18:
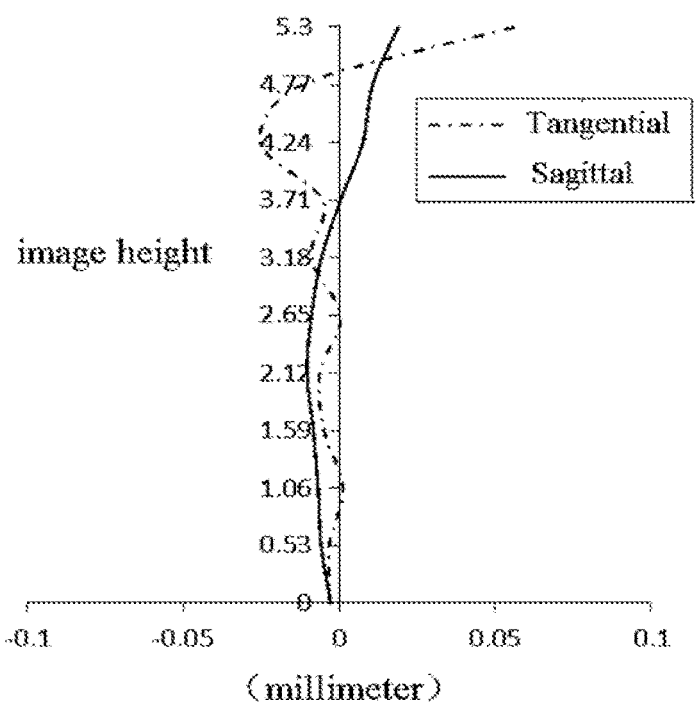
Figure 19:
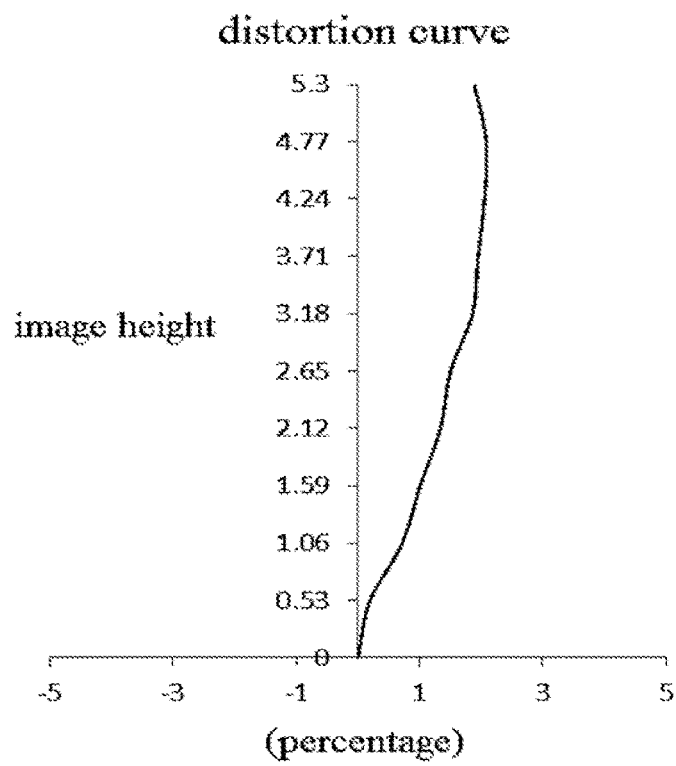
Figure 20:
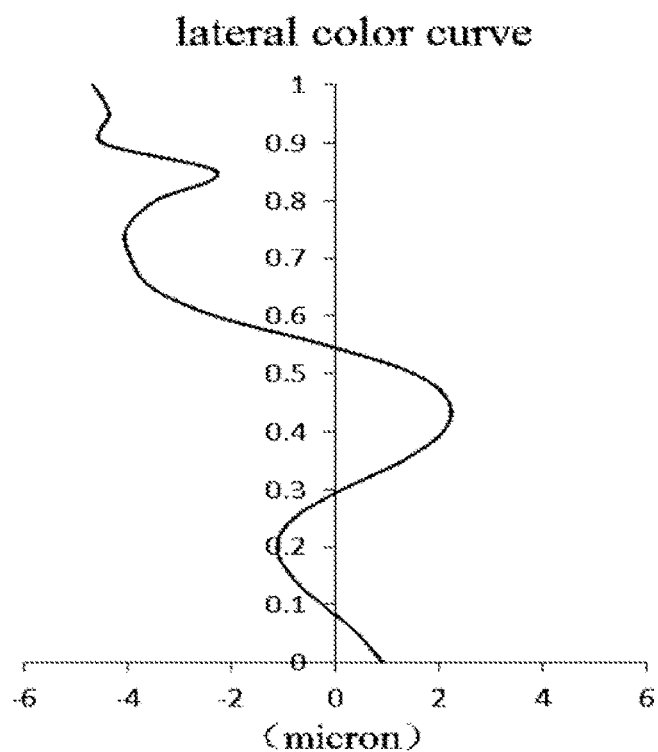

FIG. 17 shows a longitudinal aberration curve of the optical imaging lens assembly according to Example 4 to represent a deviation of a convergence focal point after light with different wavelengths passes through the optical imaging lens assembly. FIG. 18 shows an astigmatism curve of the optical imaging lens assembly according to Example 4 to represent a tangential image surface curvature and a sagittal image surface curvature. FIG. 19 shows a distortion curve of the optical imaging lens assembly according to Example 4 to represent distortion values corresponding to different fields of view. FIG. 20 shows a lateral color curve of the optical imaging lens assembly according to Example 4 to represent deviations of different image heights on the imaging surface after the light passes through the optical imaging lens assembly.

According to FIGS. 17-20, it can be seen that the optical imaging lens assembly provided in Example 4 may achieve high imaging quality.

Example 5

Figure 21:
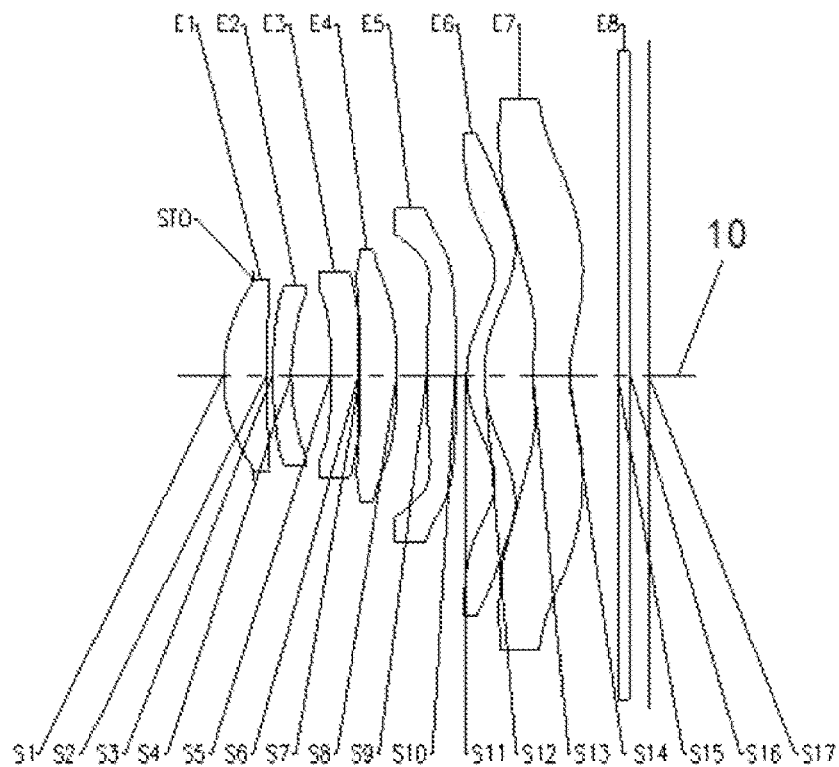
FIG. 21 shows a structural schematic diagram of an optical imaging lens assembly according to Example 5 of the disclosure.

As shown in FIGS. 21-25, an optical imaging lens assembly according to Example 5 of the disclosure is described. In the example and the following examples, parts of descriptions similar to those in Example 1 are omitted for simplicity. FIG. 21 shows a structural schematic diagram of an optical imaging lens assembly according to Example 5.

As shown in FIG. 21, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a positive refractive power, an object-side surface S9 of the fifth lens is a convex surface, and an image-side surface S10 of the fifth lens is a concave surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens assembly is 5.68 mm, and a maximum field of view of the optical imaging lens assembly is 85.0°.

Table 9 shows a basic structural parameter table of the optical imaging lens assembly of Example 5, wherein the units of the curvature radius, the thickness/distance and the focal length are all millimeters (mm).

TABLE 9

| Surface number | Surface type | Curvature radius | Thickness | Material Refractive index | Material Abbe number | Conic coefficient |
|---|---|---|---|---|---|---|
| OBJ | Spherical | Infinite | Infinite | | | |
| STO | Spherical | Infinite | −0.4911 | | | |
| S1 | Aspheric | 2.5521 | 0.7053 | 1.546 | 55.92 | 0.0000 |
| S2 | Aspheric | 33.6687 | 0.0978 | | | 0.0000 |
| S3 | Aspheric | 5.7853 | 0.3000 | 1.677 | 19.24 | 0.0000 |
| S4 | Aspheric | 3.5250 | 0.6554 | | | 0.0000 |
| S5 | Aspheric | −18.7702 | 0.4529 | 1.667 | 20.37 | 0.0000 |
| S6 | Aspheric | −955.1707 | 0.0242 | | | 0.0000 |
| S7 | Aspheric | −28.1725 | 0.6066 | 1.546 | 55.92 | 0.0000 |
| S8 | Aspheric | −10.1861 | 0.4900 | | | 0.0000 |
| S9 | Aspheric | 17.2239 | 0.4700 | 1.570 | 37.4 | 0.0000 |
| S10 | Aspheric | 18.1500 | 0.1852 | | | 0.0000 |
| S11 | Aspheric | 1.5826 | 0.2903 | 1.537 | 55.71 | −1.0000 |
| S12 | Aspheric | 2.2090 | 0.8049 | | | −1.0000 |
| S13 | Aspheric | 4.0729 | 0.5900 | 1.537 | 55.71 | −20.8198 |
| S14 | Aspheric | 1.7790 | 0.7912 | | | −1.0000 |
| S15 | Spherical | Infinite | 0.2100 | 1.518 | 64.17 | |
| S16 | Spherical | Infinite | 0.3002 | | | |
| S17 | Spherical | Infinite | | | | |

Table 10 shows high-order coefficients applied to each aspheric mirror surface in Example 5. A surface type of each aspheric surface may be defined by formula (1) given in Example 1.

TABLE 10

| Surface number | A4 | A6 | A8 | A10 | A12 | A14 | A16 |
|---|---|---|---|---|---|---|---|
| S1 | 8.1958E−02 | −3.2448E−02 | 1.1846E−02 | −3.0425E−03 | 5.0454E−04 | −4.5637E−06 | −2.5904E−05 |
| S2 | 7.7505E−02 | −1.5789E−02 | 7.2581E−03 | −1.0605E−03 | 6.9949E−04 | −9.1845E−05 | 7.1153E−05 |
| S3 | −8.6399E−02 | 4.0140E−02 | −8.9912E−03 | 4.2046E−03 | −2.9596E−04 | 6.7327E−05 | 2.4799E−05 |
| S4 | −5.5097E−02 | 2.4470E−02 | −8.7323E−03 | 4.2955E−03 | −1.4858E−03 | 5.6674E−04 | −2.0368E−04 |
| S5 | −1.4394E−01 | −9.2250E−03 | 2.0521E−03 | 1.5687E−03 | 6.5266E−04 | 1.7419E−04 | 5.1484E−05 |
| S6 | −1.4957E−01 | −1.8570E−04 | 1.4038E−02 | −3.5691E−04 | 3.0051E−03 | −1.4023E−03 | 2.4442E−04 |
| S7 | 1.2805E−02 | 3.4460E−02 | 9.2105E−03 | −7.8006E−03 | 2.6935E−03 | −3.2286E−03 | 1.6218E−03 |
| S8 | −2.5686E−01 | 6.3519E−02 | 1.8318E−02 | −3.6178E−03 | −1.0283E−03 | −2.7282E−03 | −1.0819E−03 |
| S9 | −5.3528E−01 | −1.9445E−01 | 2.4067E−02 | 2.1808E−02 | 1.5063E−02 | 8.3928E−04 | −1.2413E−03 |
| S10 | −7.9862E−01 | 8.0612E−02 | 2.0371E−02 | 1.8654E−02 | −1.5409E−02 | −2.0260E−03 | 3.4466E−03 |
| S11 | −5.3015E+00 | 1.1998E+00 | −1.8552E−01 | −8.1554E−02 | 7.7123E−02 | −2.7464E−02 | −7.9119E−03 |
| S12 | −3.9866E+00 | 5.7895E−01 | −2.1009E−03 | −1.0149E−01 | 7.0786E−02 | −1.1372E−02 | −1.3141E−03 |
| S13 | −1.9125E+00 | 8.8841E−01 | −4.0066E−01 | 1.8728E−01 | −8.2906E−02 | 6.3174E−02 | −3.7218E−02 |
| S14 | −7.2356E+00 | 1.7620E+00 | −5.3073E−01 | 2.2237E−01 | −1.1284E−01 | 5.0868E−02 | −1.8705E−02 |

| Surface number | A18 | A20 | A22 | A24 | A26 | A28 | A30 |
|---|---|---|---|---|---|---|---|
| S1 | 7.4161E−06 | 6.3276E−06 | 0.0000E+00 | 0.0000E+00 | 0.0000E+00 | 0.0000E+00 | 0.0000E+00 |
| S2 | 3.2524E−08 | −1.2741E−05 | 0.0000E+00 | 0.0000E+00 | 0.0000E+00 | 0.0000E+00 | 0.0000E+00 |
| S3 | −2.7535E−06 | −3.4497E−06 | 0.0000E+00 | 0.0000E+00 | 0.0000E+00 | 0.0000E+00 | 0.0000E+00 |
| S4 | 7.1556E−05 | −1.9320E−05 | 0.0000E+00 | 0.0000E+00 | 0.0000E+00 | 0.0000E+00 | 0.0000E+00 |
| S5 | 1.4830E−05 | −1.3979E−06 | 0.0000E+00 | 0.0000E+00 | 0.0000E+00 | 0.0000E+00 | 0.0000E+00 |
| S6 | 4.1761E−04 | −1.6676E−04 | 0.0000E+00 | 0.0000E+00 | 0.0000E+00 | 0.0000E+00 | 0.0000E+00 |
| S7 | −5.8325E−04 | −6.0436E−04 | 3.2932E−04 | −1.0507E−04 | −6.0340E−05 | 1.1131E−05 | 3.5383E−06 |
| S8 | −4.1064E−04 | −2.0898E−04 | −6.1214E−05 | 2.1157E−06 | 5.9733E−05 | 3.9487E−05 | 1.5598E−05 |
| S9 | −1.2201E−03 | −5.1734E−04 | 7.1784E−05 | 1.1227E−04 | 7.8753E−05 | −9.8500E−06 | −2.3147E−05 |
| S10 | 9.3298E−04 | −1.0568E−04 | 8.2702E−05 | 6.3192E−05 | −1.4258E−06 | −9.2419E−05 | −1.9950E−05 |
| S11 | 9.4799E−03 | 5.0514E−04 | −3.7873E−03 | 1.0252E−03 | 6.8745E−04 | −2.6226E−04 | 8.0630E−06 |
| S12 | −1.8466E−02 | 6.4335E−03 | 4.1884E−03 | −2.9699E−03 | −3.3646E−03 | 9.4464E−04 | 9.8248E−04 |
| S13 | 1.4923E−03 | 1.0753E−02 | −6.9550E−03 | −2.2417E−03 | 2.4028E−03 | 1.6355E−03 | −1.5713E−03 |
| S14 | 1.3602E−02 | −5.7339E−03 | 3.2430E−04 | −7.5920E−04 | −4.1336E−04 | 2.7613E−04 | −2.3187E−04 |

Figure 22:
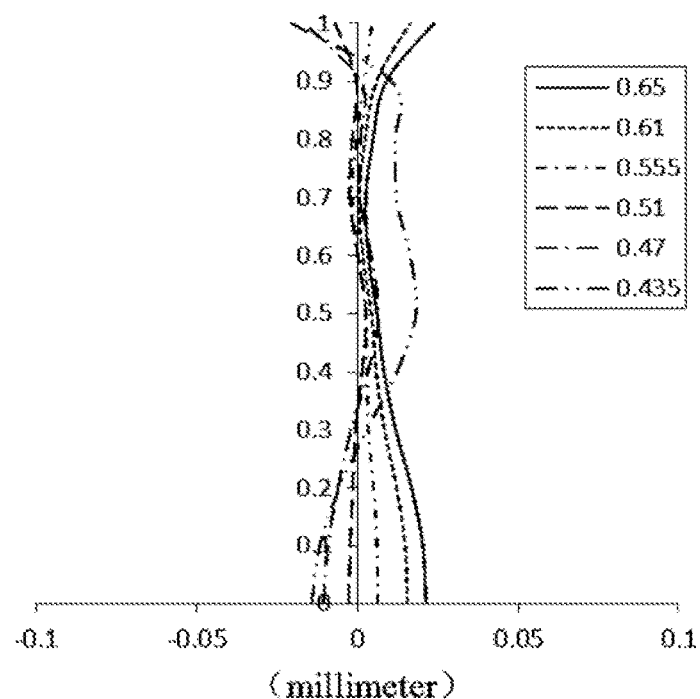
FIGS. 22-25 show a longitudinal aberration curve, an astigmatism curve, a distortion curve and a lateral color curve of the optical imaging lens assembly in FIG. 21 respectively.
Figure 23:
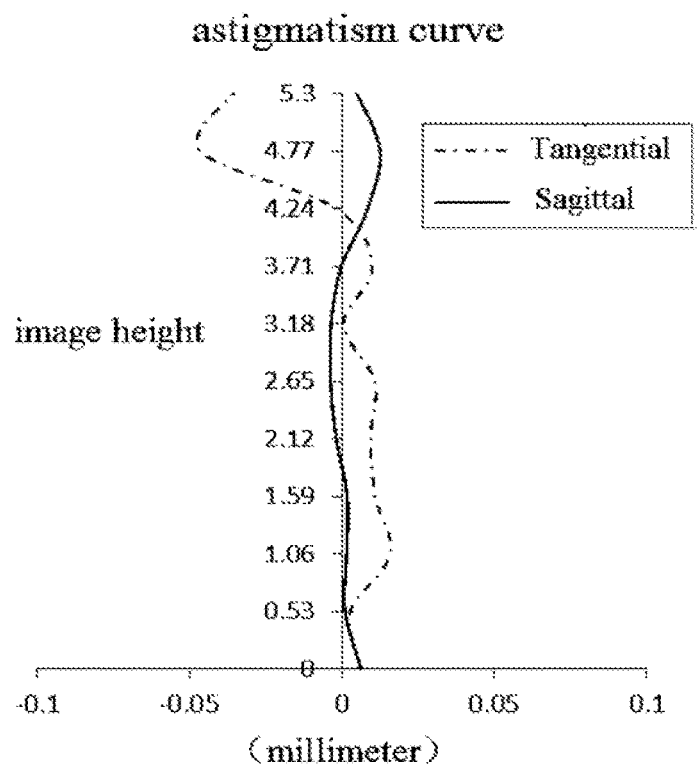
Figure 24:
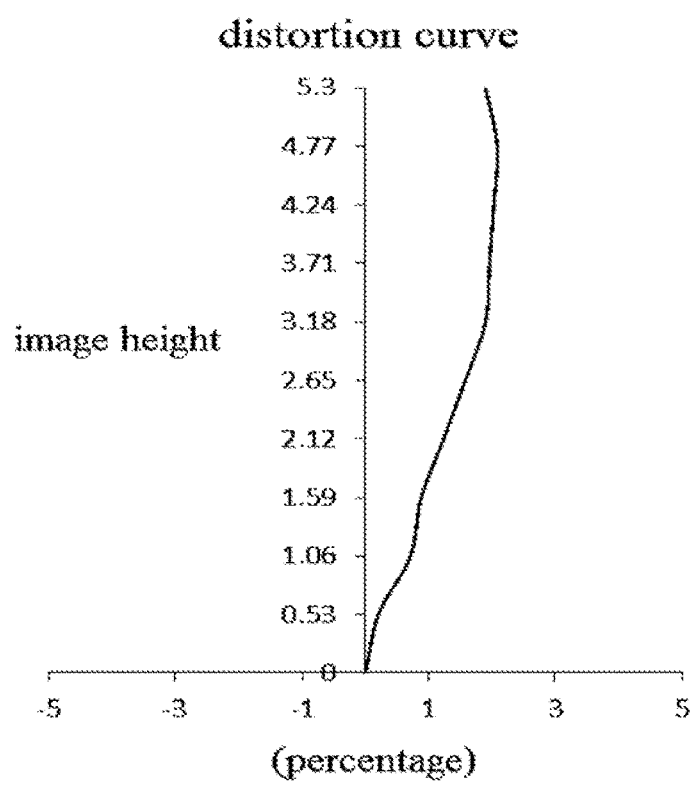
Figure 25:
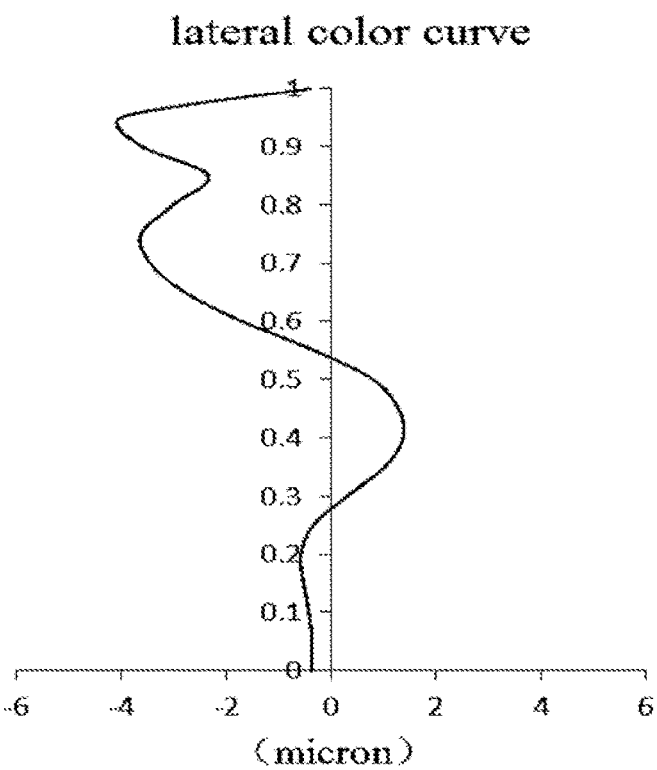

FIG. 22 shows a longitudinal aberration curve of the optical imaging lens assembly according to Example 5 to represent a deviation of a convergence focal point after light with different wavelengths passes through the optical imaging lens assembly. FIG. 23 shows an astigmatism curve of the optical imaging lens assembly according to Example 5 to represent a tangential image surface curvature and a sagittal image surface curvature. FIG. 24 shows a distortion curve of the optical imaging lens assembly according to Example 5 to represent distortion values corresponding to different fields of view. FIG. 25 shows a lateral color curve of the optical imaging lens assembly according to Example 5 to represent deviations of different image heights on the imaging surface after the light passes through the optical imaging lens assembly.

According to FIGS. 22-25, it can be seen that the optical imaging lens assembly provided in Example 5 may achieve high imaging quality.

Example 6

Figure 26:
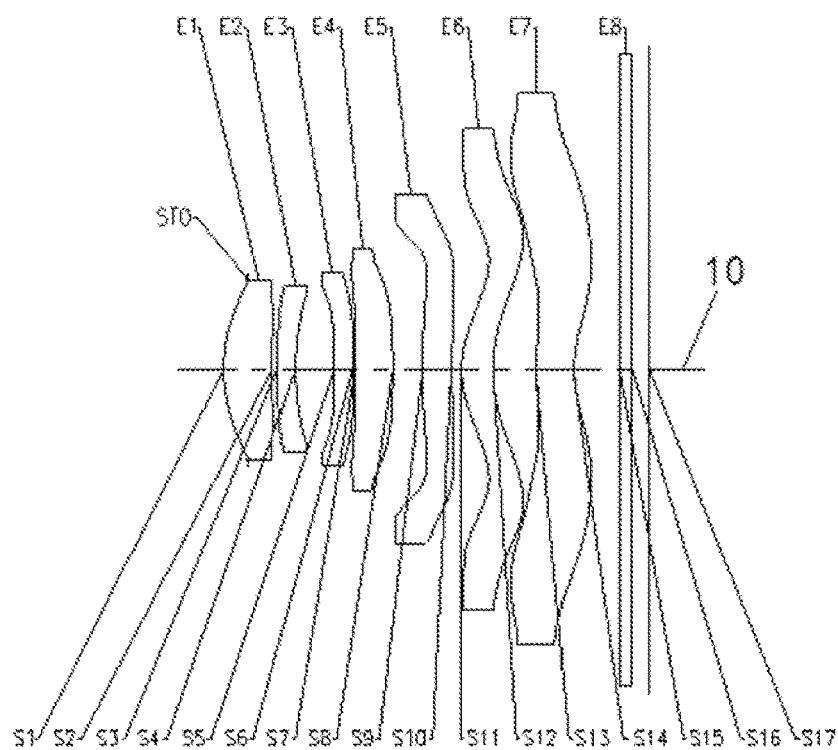
FIG. 26 shows a structural schematic diagram of an optical imaging lens assembly according to Example 6 of the disclosure.

As shown in FIGS. 26-30, an optical imaging lens assembly according to Example 6 of the disclosure is described. In the example and the following examples, parts of descriptions similar to those in Example 1 are omitted for simplicity. FIG. 26 shows a structural schematic diagram of an optical imaging lens assembly according to Example 6.

As shown in FIG. 26, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a concave surface, and an image-side surface S6 of the third lens is a concave surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a convex surface, and an image-side surface S10 of the fifth lens is a concave surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens assembly is 5.52 mm, and a maximum field of view of the optical imaging lens assembly is 86.40.

Table 11 shows a basic structural parameter table of the optical imaging lens assembly of Example 6, wherein the units of the curvature radius, the thickness/distance and the focal length are all millimeters (mm).

TABLE 11

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.4010 | | | |
| S1 | Aspheric | 2.5460 | 0.7967 | 1.546 | 56.14 | 0.0000 |
| S2 | Aspheric | 18.1010 | 0.0791 | | | 0.0000 |
| S3 | Aspheric | 7.9964 | 0.3000 | 1.677 | 19.24 | 0.0000 |
| S4 | Aspheric | 4.4183 | 0.6354 | | | 0.0000 |
| S5 | Aspheric | −22.6304 | 0.3000 | 1.677 | 19.24 | 0.0000 |
| S6 | Aspheric | 131.2320 | 0.0404 | | | 0.0000 |
| S7 | Aspheric | 244.8761 | 0.6269 | 1.546 | 56.14 | 0.0000 |
| S8 | Aspheric | −11.8355 | 0.4900 | | | 0.0000 |
| S9 | Aspheric | 17.8074 | 0.4700 | 1.570 | 37.4 | 0.0000 |
| S10 | Aspheric | 3.8347 | 0.1628 | | | 0.0000 |
| S11 | Aspheric | 1.4918 | 0.5271 | 1.537 | 55.71 | −1.0004 |
| S12 | Aspheric | 3.2496 | 0.6991 | | | −1.0006 |
| S13 | Aspheric | 3.3041 | 0.6103 | 1.537 | 55.71 | −0.9912 |
| S14 | Aspheric | 1.6468 | 0.7585 | | | −0.9985 |
| S15 | Spherical | Infinite | 0.2100 | 1.518 | 64.17 | |
| S16 | Spherical | Infinite | 0.2736 | | | |
| S17 | Spherical | Infinite | | | | |

Table 12 shows high-order coefficients applied to each aspheric mirror surface in Example 6. A surface type of each aspheric surface may be defined by formula (1) given in Example 1.

TABLE 12

| Surface number | A4 | A6 | A8 | A10 | A12 | A14 | A16 |
|---|---|---|---|---|---|---|---|
| S1  | −3.8735E−02 | −1.0099E−02 | −2.1261E−03 | −2.7034E−04 | −1.1722E−05 | 1.9613E−05 | −1.1623E−06 |
| S2  | −7.3842E−02 | 4.7146E−03  | −2.5119E−03 | 6.0811E−04  | −1.1029E−04 | 1.3325E−05 | −3.4261E−06 |
| S3  | −1.5410E−02 | 1.7410E−02  | −8.9641E−04 | 8.8779E−04  | −4.9862E−05 | 9.9183E−06 | −1.4520E−06 |
| S4  | 4.0698E−03  | 6.0432E−03  | −9.2828E−05 | 4.0937E−04  | 6.8541E−05  | 2.3855E−05 | 7.4310E−06  |
| S5  | −1.7131E−01 | −9.2083E−03 | 2.4923E−03  | 2.3783E−03  | 1.0351E−03  | 1.6725E−04 | 4.1304E−05  |
| S6  | −1.9162E−01 | 6.8676E−03  | 1.2780E−02  | 2.4091E−03  | 2.3825E−03  | −1.1531E−03 | 1.7989E−05 |
| S7  | −8.6871E−02 | 3.0148E−02  | 1.3510E−02  | −4.1066E−03 | 1.0579E−03  | −2.5004E−03 | 1.1785E−03 |
| S8  | −2.3398E−01 | 3.3426E−02  | 3.0693E−02  | 2.4126E−03  | 1.0089E−03  | −1.4492E−03 | −9.4681E−04 |
| S9  | −4.9124E−01 | −1.7902E−01 | 3.8618E−02  | 3.9765E−02  | 7.1693E−03  | 4.5794E−04 | −4.5091E−03 |
| S10 | −1.8775E+00 | 2.5768E−01  | −6.1407E−02 | 6.2959E−02  | −4.5369E−02 | 1.4511E−02 | −3.5091E−03 |
| S11 | −5.2066E+00 | 1.1492E+00  | −1.6354E−01 | −4.1912E−02 | 5.8247E−03  | 1.7020E−02 | −1.6067E−02 |
| S12 | −2.7386E+00 | 3.2362E−01  | 1.6502E−01  | −1.4518E−01 | 3.8196E−02  | −1.3615E−02 | 9.9726E−03 |
| S13 | −4.1245E+00 | 1.3648E+00  | −4.9933E−01 | 1.9152E−01  | −8.8006E−02 | 6.3121E−02 | −3.3450E−02 |
| S14 | −8.1326E+00 | 1.9881E+00  | −6.0567E−01 | 2.4163E−01  | −1.0932E−01 | 5.0788E−02 | −1.5755E−02 |

| Surface number | A18 | A20 | A22 | A24 | A26 | A28 | A30 |
|---|---|---|---|---|---|---|---|
| S1  | −3.4145E−07 | −1.1255E−06 | 1.5388E−06  | 0.0000E+00  | 0.0000E+00  | 0.0000E+00  | 0.0000E+00 |
| S2  | −3.5936E−06 | 3.5064E−06  | 0.0000E+00  | 0.0000E+00  | 0.0000E+00  | 0.0000E+00  | 0.0000E+00 |
| S3  | −3.2851E−06 | 3.2675E−06  | 2.7377E−07  | 0.0000E+00  | 0.0000E+00  | 0.0000E+00  | 0.0000E+00 |
| S4  | −9.2197E−08 | 1.8040E−06  | 5.1085E−07  | 0.0000E+00  | 0.0000E+00  | 0.0000E+00  | 0.0000E+00 |
| S5  | −1.0879E−06 | −1.2879E−05 | −6.9707E−06 | 0.0000E+00  | 0.0000E+00  | 0.0000E+00  | 0.0000E+00 |
| S6  | 1.5059E−04  | −6.7674E−05 | −9.3387E−06 | 0.0000E+00  | 0.0000E+00  | 0.0000E+00  | 0.0000E+00 |
| S7  | 2.5701E−05  | −3.0965E−04 | 1.0380E−04  | −5.8129E−06 | −1.0550E−05 | −4.9097E−06 | 2.4753E−06 |
| S8  | −5.0146E−05 | −2.7036E−05 | 1.4698E−05  | 3.0717E−05  | 1.8301E−05  | 1.5919E−05  | −1.0595E−05 |
| S9  | −1.0421E−03 | −2.5270E−04 | 4.1021E−04  | 1.2325E−04  | −1.3588E−05 | −6.1546E−06 | −6.0151E−06 |
| S10 | 4.6472E−03  | −1.4870E−03 | −5.6315E−05 | −5.7070E−05 | 1.3569E−04  | 4.5972E−05  | −8.9799E−07 |
| S11 | 7.0255E−03  | −1.3570E−03 | −1.2567E−03 | 2.0673E−04  | 4.9912E−04  | −5.3169E−04 | 7.9318E−05 |
| S12 | −1.3064E−02 | 6.4375E−03  | −7.6793E−04 | −3.2371E−04 | −2.0925E−03 | 1.1223E−03  | 1.5540E−04 |
| S13 | −5.7179E−04 | 8.2995E−03  | −6.2913E−03 | 3.6280E−04  | 1.9455E−03  | −1.0171E−03 | −3.2294E−04 |
| S14 | 1.0108E−02  | −9.1893E−03 | −1.4220E−03 | −2.0315E−03 | 5.1312E−04  | −3.0929E−04 | 4.2201E−04 |

Figure 27:
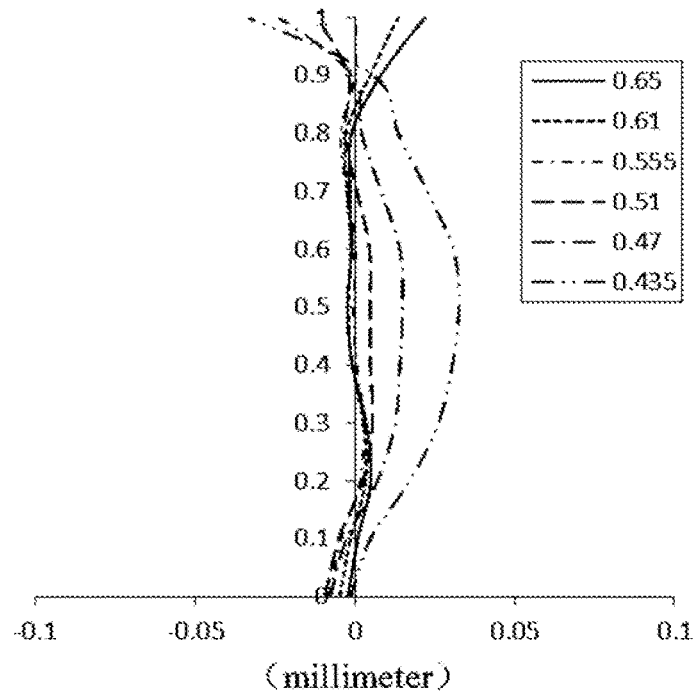
FIGS. 27-30 show a longitudinal aberration curve, an astigmatism curve, a distortion curve and a lateral color curve of the optical imaging lens assembly in FIG. 26 respectively.
Figure 28:
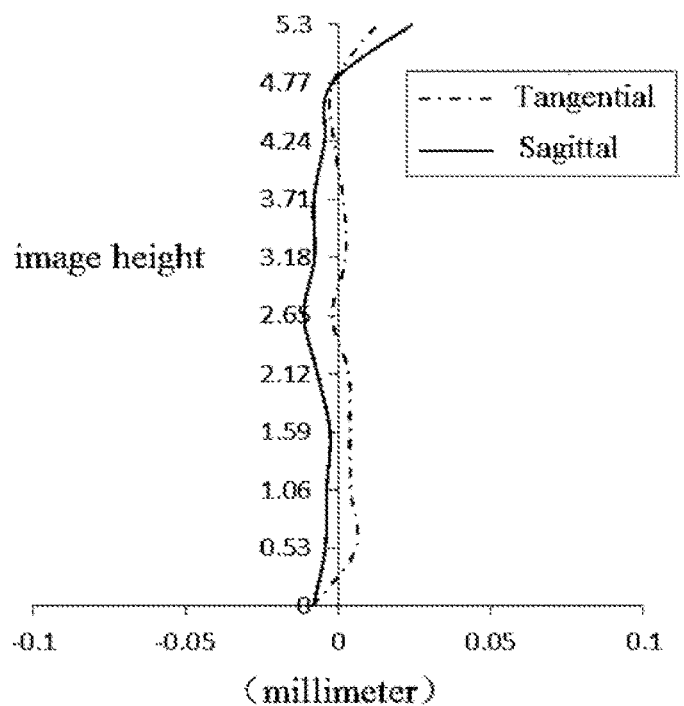
Figure 29:
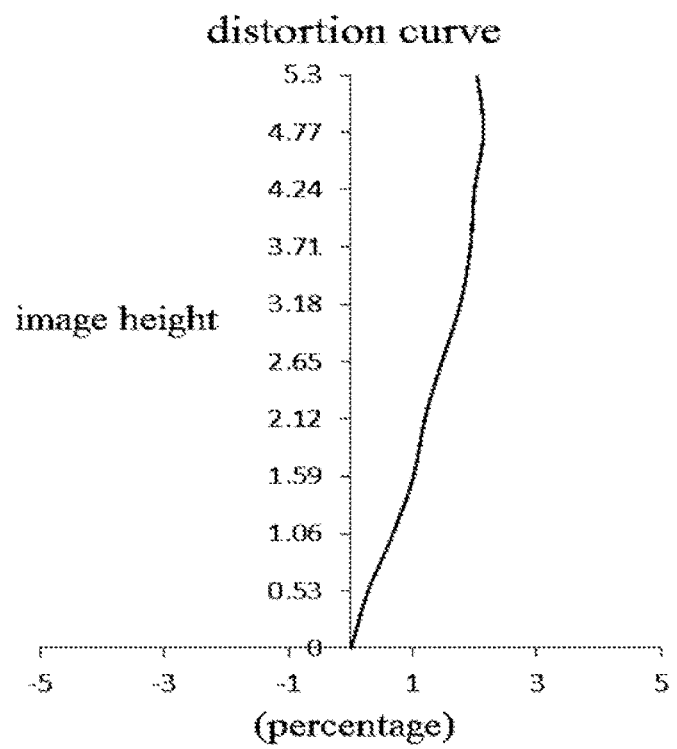
Figure 30:
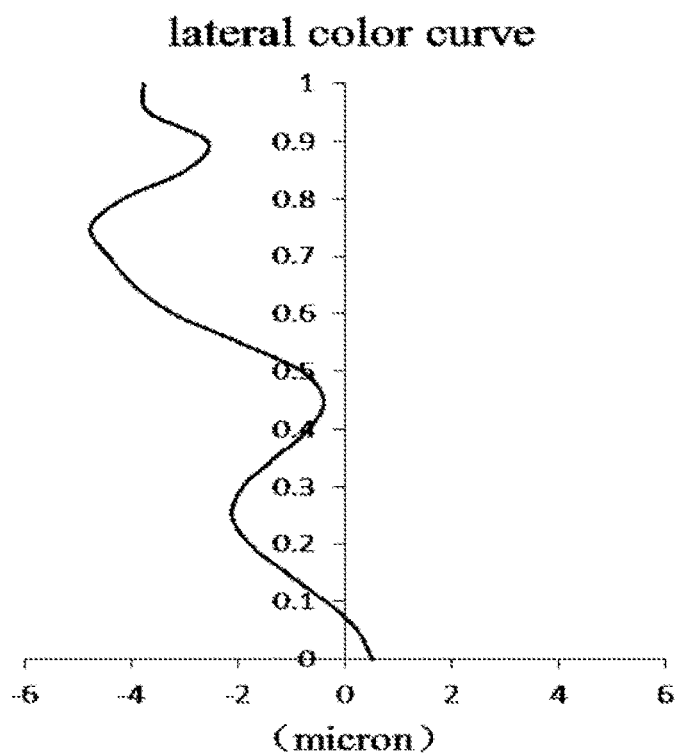

FIG. 27 shows a longitudinal aberration curve of the optical imaging lens assembly according to Example 6 to represent a deviation of a convergence focal point after light with different wavelengths passes through the optical imaging lens assembly. FIG. 28 shows an astigmatism curve of the optical imaging lens assembly according to Example 6 to represent a tangential image surface curvature and a sagittal image surface curvature. FIG. 29 shows a distortion curve of the optical imaging lens assembly according to Example 6 to represent distortion values corresponding to different fields of view. FIG. 30 shows a lateral color curve of the optical imaging lens assembly according to Example 6 to represent deviations of different image heights on the imaging surface after the light passes through the optical imaging lens assembly.

According to FIGS. 27-30, it can be seen that the optical imaging lens assembly provided in Example 6 may achieve high imaging quality.

Example 7

Figure 31:
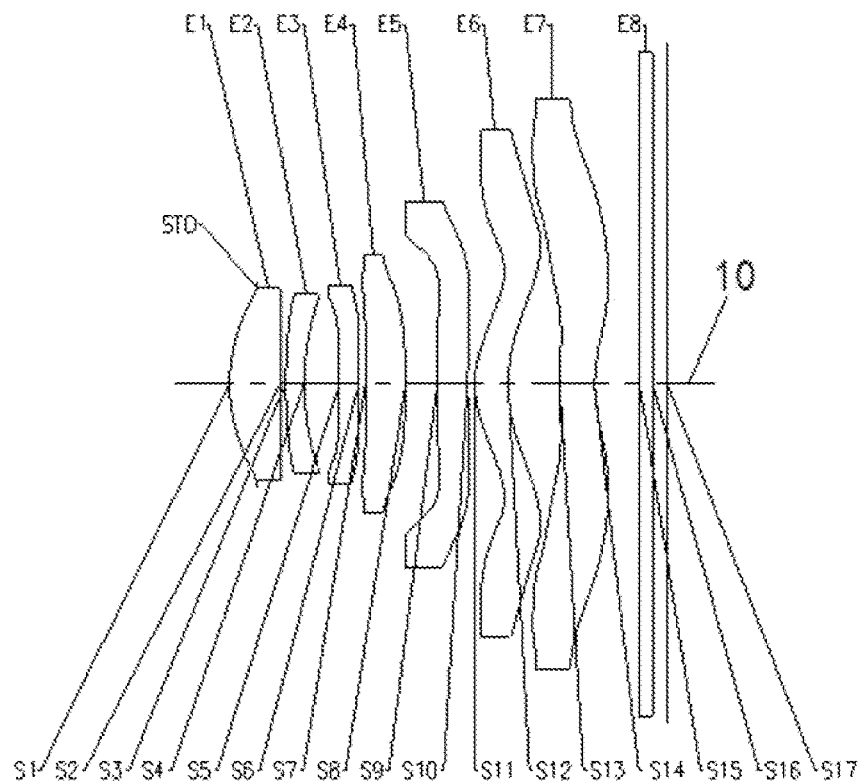
FIG. 31 shows a structural schematic diagram of an optical imaging lens assembly according to Example 7 of the disclosure.

As shown in FIGS. 31-35, an optical imaging lens assembly according to Example 7 of the disclosure is described. In the example and the following examples, parts of descriptions similar to those in Example 1 are omitted for simplicity. FIG. 31 shows a structural schematic diagram of an optical imaging lens assembly according to Example 7.

As shown in FIG. 31, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a convex surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a convex surface, and an image-side surface S6 of the third lens is a concave surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S6, and is finally imaged on the imaging surface 17.

In the example, a total effective focal length f of the optical imaging lens assembly is 5.59 mm, and a maximum field of view of the optical imaging lens assembly is 85.7°.

Table 13 shows a basic structural parameter table of the optical imaging lens assembly of Example 7, wherein the units of the curvature radius, the thickness/distance and the focal length are all millimeters (mm).

TABLE 13

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.4380 | | | |
| S1 | Aspheric | 2.7536 | 0.8141 | 1.546 | 55.92 | 0.0000 |
| S2 | Aspheric | −175.7866 | 0.0780 | | | 0.0000 |
| S3 | Aspheric | 7.0991 | 0.2970 | 1.677 | 19.24 | 0.0000 |
| S4 | Aspheric | 3.8988 | 0.5614 | | | 0.0000 |
| S5 | Aspheric | 211.2557 | 0.3132 | 1.667 | 20.37 | 0.0000 |
| S6 | Aspheric | 14.5995 | 0.1087 | | | 0.0000 |
| S7 | Aspheric | 24.6377 | 0.6457 | 1.546 | 55.92 | 0.0000 |
| S8 | Aspheric | −10.6040 | 0.5092 | | | 0.0000 |
| S9 | Aspheric | −33.7633 | 0.4846 | 1.570 | 37.4 | 0.0000 |
| S10 | Aspheric | 4.3942 | 0.1135 | | | 0.0000 |
| S11 | Aspheric | 1.3920 | 0.5436 | 1.537 | 55.71 | −1.0000 |
| S12 | Aspheric | 3.1989 | 0.8192 | | | −1.0000 |
| S13 | Aspheric | 5.2101 | 0.5549 | 1.537 | 55.71 | 0.0000 |
| S14 | Aspheric | 2.0126 | 0.7219 | | | −1.0000 |
| S15 | Spherical | Infinite | 0.2100 | 1.518 | 64.17 | |
| S16 | Spherical | Infinite | 0.2370 | | | |
| S17 | Spherical | Infinite | | | | |

Table 14 shows high-order coefficients applied to each aspheric mirror surface in Example 7. A surface type of each aspheric surface may be defined by formula (1) given in Example 1.

TABLE 14

| Surface number | A4 | A6 | A8 | A10 | A12 | A14 | A16 |
|---|---|---|---|---|---|---|---|
| S1 | 8.1704E−02 | −2.2625E−02 | 5.7769E−03 | −9.2775E−04 | 5.7101E−05 | −4.2888E−06 | 2.7281E−05 |
| S2 | 6.3602E−02 | −9.2978E−03 | 3.9304E−03 | 7.1297E−04 | 6.7965E−04 | 2.0663E−05 | 4.1924E−05 |
| S3 | −7.6302E−02 | 2.5212E−02 | −3.6779E−03 | 2.5121E−03 | 5.2820E−04 | −4.9444E−05 | 9.3390E−05 |
| S4 | −2.2353E−02 | 7.7139E−03 | −2.4622E−03 | 2.1378E−03 | −5.2878E−04 | 2.2683E−04 | −5.3698E−05 |
| S5 | −1.6881E−01 | −8.2791E−03 | 1.8825E−04 | 1.8328E−03 | 6.3612E−04 | 2.0224E−04 | 2.1983E−05 |
| S6 | −2.2828E−01 | 1.7927E−02 | 7.4045E−03 | 4.2982E−03 | 5.8111E−04 | −2.4970E−04 | −1.8011E−04 |
| S7 | −1.4652E−01 | 4.6061E−02 | 6.7471E−03 | −1.4409E−03 | −1.8273E−03 | −1.0495E−03 | 2.3819E−05 |
| S8 | −2.1736E−01 | 2.7632E−02 | 2.9428E−02 | 2.0265E−03 | −2.5723E−04 | −2.0840E−03 | −1.5289E−03 |
| S9 | −2.8695E−01 | −2.3397E−01 | 4.9369E−02 | 3.1891E−02 | 1.3390E−02 | 2.1763E−03 | −3.2231E−03 |
| S10 | −1.6599E+00 | 2.4250E−01 | −5.7480E−02 | 5.0334E−02 | −3.7127E−02 | 1.4819E−02 | −4.9466E−03 |
| S11 | −5.5970E+00 | 1.2642E+00 | −2.3548E−01 | −2.3104E−02 | 2.7051E−02 | 8.2395E−03 | −2.4951E−02 |
| S12 | −2.7304E+00 | 2.8834E−01 | 1.2744E−01 | −1.4445E−01 | 7.5134E−02 | −1.4688E−02 | −2.9910E−03 |
| S13 | −3.2799E+00 | 9.5461E−01 | −3.8123E−01 | 1.6004E−01 | −8.0189E−02 | 6.2027E−02 | −3.4177E−02 |
| S14 | −6.5606E+00 | 1.6016E+00 | −4.6723E−01 | 1.9463E−01 | −9.3860E−02 | 3.6231E−02 | −6.4572E−03 |

| Surface number | A18 | A20 | A22 | A24 | A26 | A28 | A30 |
|---|---|---|---|---|---|---|---|
| S1 | −1.4204E−05 | 8.5464E−06 | 0.0000E+00 | 0.0000E+00 | 0.0000E+00 | 0.0000E+00 | 0.0000E+00 |
| S2 | 2.8652E−05 | −2.4074E−05 | 0.0000E+00 | 0.0000E+00 | 0.0000E+00 | 0.0000E+00 | 0.0000E+00 |
| S3 | −1.0598E−05 | −1.1541E−05 | 0.0000E+00 | 0.0000E+00 | 0.0000E+00 | 0.0000E+00 | 0.0000E+00 |
| S4 | 5.5927E−06 | −3.7835E−06 | 0.0000E+00 | 0.0000E+00 | 0.0000E+00 | 0.0000E+00 | 0.0000E+00 |
| S5 | 2.8978E−06 | −7.3614E−06 | 0.0000E+00 | 0.0000E+00 | 0.0000E+00 | 0.0000E+00 | 0.0000E+00 |
| S6 | −1.4079E−05 | −1.3589E−05 | 0.0000E+00 | 0.0000E+00 | 0.0000E+00 | 0.0000E+00 | 0.0000E+00 |
| S7 | 5.4479E−05 | −1.5205E−04 | −5.8923E−05 | −3.1613E−05 | −5.5248E−06 | −5.3475E−07 | 7.7269E−06 |
| S8 | −4.2270E−04 | −3.2011E−05 | 1.1484E−04 | 9.4318E−05 | 4.7814E−05 | 4.4340E−06 | −1.3925E−05 |
| S9 | −2.4085E−03 | −9.4868E−04 | 4.2156E−05 | 1.3083E−04 | −2.8295E−05 | −4.1796E−05 | −1.4160E−05 |
| S10 | 2.5595E−03 | −5.3594E−04 | −5.9208E−06 | −4.0104E−04 | −7.0880E−05 | 1.2242E−04 | 2.4420E−05 |
| S11 | 1.3589E−02 | −4.4260E−04 | −5.2239E−03 | 1.3245E−03 | 6.7524E−04 | −7.3796E−04 | −9.4177E−05 |
| S12 | −1.8303E−02 | 1.2839E−02 | −3.5539E−03 | −1.5268E−03 | −2.8234E−03 | 2.9147E−03 | −1.2223E−04 |
| S13 | −2.3017E−03 | 1.5246E−02 | −9.7022E−03 | −1.7819E−04 | 3.1371E−03 | −5.4365E−04 | −5.8731E−04 |
| S14 | 4.9061E−03 | −4.2766E−03 | −6.4883E−05 | −6.5016E−05 | 8.1705E−05 | 9.8640E−06 | 2.7599E−04 |

Figure 32:
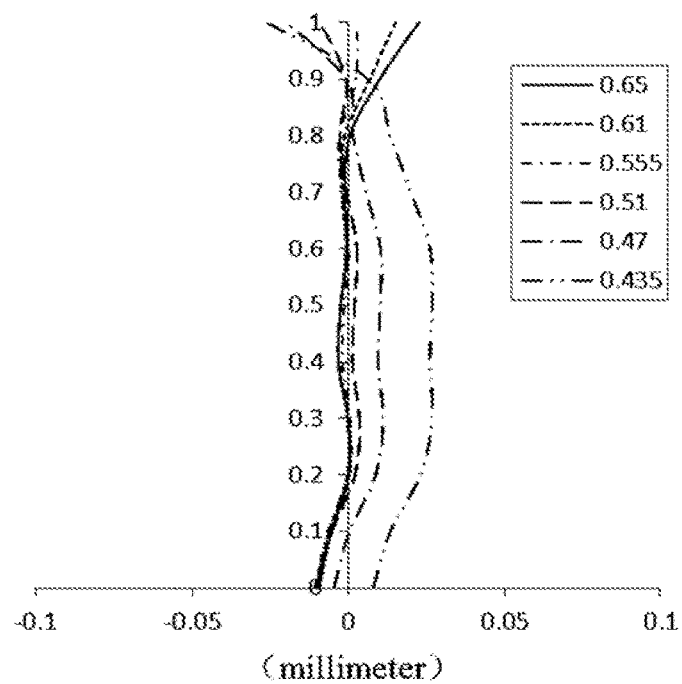
FIGS. 32-35 show a longitudinal aberration curve, an astigmatism curve, a distortion curve and a lateral color curve of the optical imaging lens assembly in FIG. 31 respectively.
Figure 33:
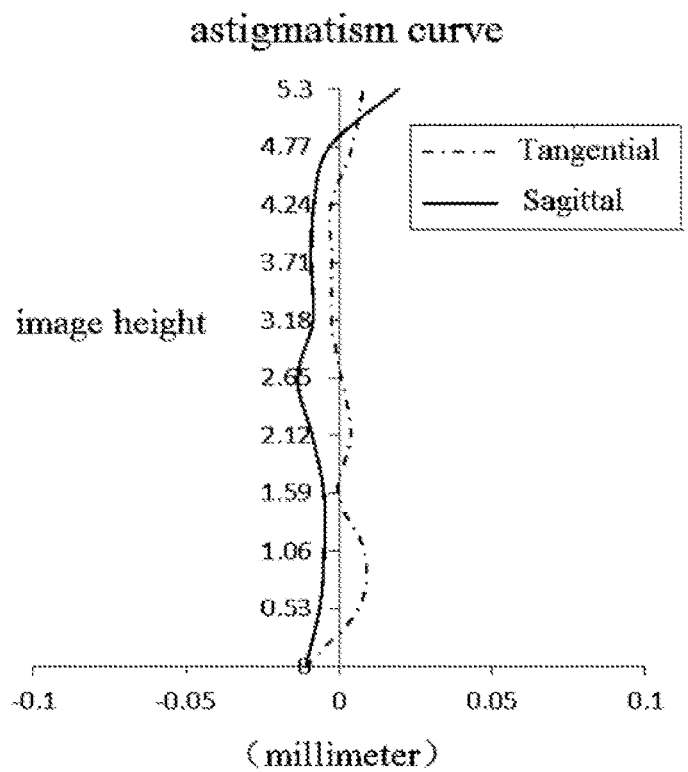
Figure 34:
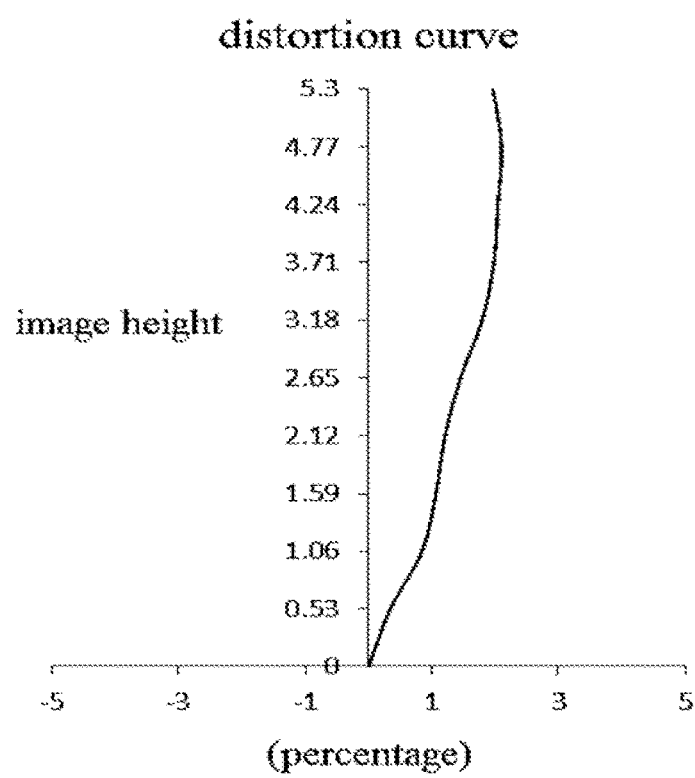
Figure 35:
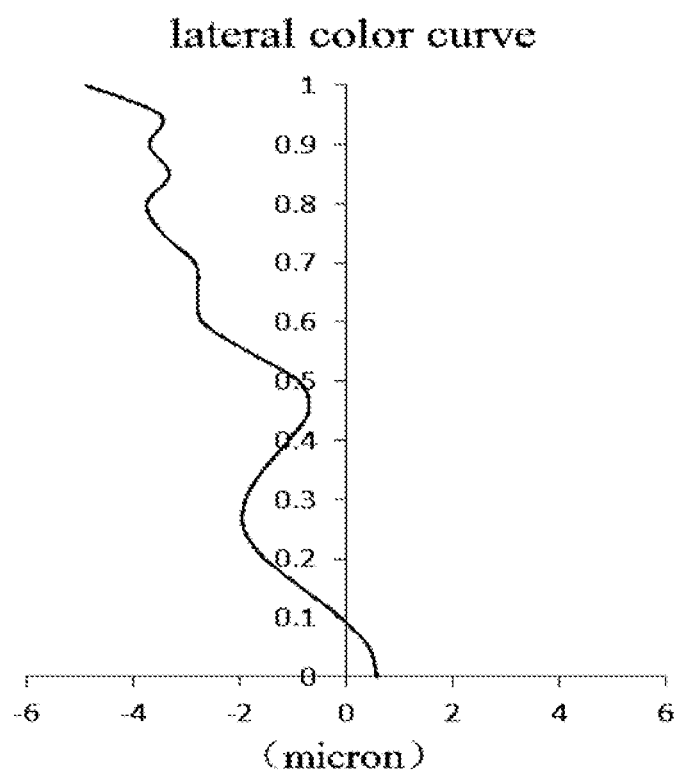

FIG. 32 shows a longitudinal aberration curve of the optical imaging lens assembly according to Example 7 to represent a deviation of a convergence focal point after light with different wavelengths passes through the optical imaging lens assembly. FIG. 33 shows an astigmatism curve of the optical imaging lens assembly according to Example 7 to represent a tangential image surface curvature and a sagittal image surface curvature. FIG. 34 shows a distortion curve of the optical imaging lens assembly according to Example 7 to represent distortion values corresponding to different fields of view. FIG. 35 shows a lateral color curve of the optical imaging lens assembly according to Example 7 to represent deviations of different image heights on the imaging surface after the light passes through the optical imaging lens assembly.

According to FIGS. 32-35, it can be seen that the optical imaging lens assembly provided in Example 7 may achieve high imaging quality.

From the above, Example 1 to Example 7 satisfy a relationship shown in Table 15 respectively.

TABLE 15

| Conditional Expression | Example | | | | | | |
|---|---|---|---|---|---|---|---|
| | 1 | 2 | 3 | 4 | 5 | 6 | 7 |
| f*tan(Semi-FOV) | 5.15 | 5.22 | 5.20 | 5.20 | 5.21 | 5.19 | 5.19 |
| f7(R13 − R14) | −3.28 | −7.31 | −2.76 | −2.80 | −2.82 | −4.24 | −2.03 |
| f/R11 + f/R12 | 5.57 | 5.35 | 5.43 | 5.42 | 6.16 | 5.40 | 5.76 |
| f/R1 + f/R8 | 1.34 | 1.78 | 1.61 | 1.64 | 1.67 | 1.70 | 1.50 |
| f/R10 | 0.46 | 0.95 | 0.70 | 0.71 | 0.31 | 1.44 | 1.27 |
| f/(R3 − R4) | 1.41 | 3.32 | 2.79 | 2.99 | 2.51 | 1.54 | 1.75 |
| (R12 − R11)/CT6 | 2.92 | 2.27 | 3.57 | 4.17 | 2.16 | 3.33 | 3.32 |
| CT7/CT6 | 1.46 | 1.06 | 1.52 | 1.72 | 2.03 | 1.16 | 1.02 |
| (T67 − T23)/(T67 − T45) | 0.76 | 1.27 | 0.32 | 0.28 | 0.47 | 0.30 | 0.83 |
| f12/f1 | 1.40 | 1.39 | 0.96 | 0.95 | 1.32 | 1.39 | 1.45 |
| f/f567 | −0.35 | −0.05 | −0.14 | −0.10 | −0.02 | −0.08 | −0.19 |
| f/f4 | 0.25 | 0.38 | 0.35 | 0.05 | 0.20 | 0.27 | 0.41 |
| f/f7 | −0.81 | −0.64 | −0.88 | −0.90 | −0.88 | −0.79 | −0.86 |
| f6/f7 | −0.88 | −0.68 | −0.91 | −0.92 | −1.38 | −0.66 | −0.64 |
| Yc62/Yc61 | 1.18 | 1.25 | 1.21 | 1.20 | 1.19 | 1.21 | 1.23 |
| YT62/YT61 | 1.04 | 1.15 | 1.08 | 1.08 | 1.08 | 1.07 | 1.07 |
| $(ET5_{max} - ET5_{min})/ET5_{min}$ | 0.04 | 0.08 | 0.14 | 0.18 | 0.23 | 0.11 | 0.07 |
| (V4 + V6 + V7)/3 − V5 | 18.38 | 18.60 | 18.38 | 18.38 | 18.38 | 18.60 | 18.38 |

Table 16 shows the effective focal lengths, effective focal lengths f1 to f7 of each lens, and maximum fields of view (FOV) of the optical imaging lens assembly in Example 1 to Example 7.

TABLE 16

| Parameters in the examples | 1 | 2 | 3 | 4 | 5 | 6 | 7 |
|---|---|---|---|---|---|---|---|
| f1 (mm) | 5.38 | 5.67 | 7.55 | 7.62 | 5.54 | 5.33 | 5.30 |
| f2 (mm) | −14.61 | −15.82 | 500.00 | 500.00 | −17.47 | −15.10 | −13.47 |
| f3 (mm) | 644.38 | −22.02 | −20.75 | 999.99 | −28.73 | −28.49 | −23.55 |
| f4 (mm) | 22.40 | 14.66 | 16.23 | 108.61 | 28.89 | 20.70 | 13.67 |
| f5 (mm) | −9.98 | −11.58 | −14.06 | −15.61 | 500.00 | −8.68 | −6.79 |
| f6 (mm) | 6.17 | 5.86 | 5.84 | 5.79 | 8.95 | 4.65 | 4.16 |
| f7 (mm) | −7.04 | −8.65 | −6.39 | −6.27 | −6.47 | −7.02 | −6.51 |
| f (mm) | 5.71 | 5.52 | 5.64 | 5.65 | 5.68 | 5.52 | 5.59 |
| FOV (°) | 84.1 | 86.8 | 85.3 | 85.3 | 85.0 | 86.4 | 85.7 |

The disclosure also provides an imaging device, of which an electronic photosensitive element may be a CCD or a CMOS. The imaging device may be an independent imaging device such as a digital camera, or may be an imaging module integrated into a mobile electronic device such as a mobile phone. The imaging device is provided with the abovementioned optical imaging lens assembly.

It is apparent that the described embodiments are not all but only part of embodiments of the disclosure. All other embodiments obtained by those of ordinary skill in the art based on the embodiments in the disclosure without creative work shall fall within the scope of protection of the disclosure.

It is to be noted that terms used herein are only adopted to describe specific implementation modes and not intended to limit exemplary implementation modes according to the disclosure. For example, singular forms, used herein, are also intended to include plural forms, unless otherwise clearly pointed out. In addition, it is also to be understood that terms "contain" and/or "include" used in the specification refer/refers to existence of features, steps, work, apparatuses, components and/or combinations thereof.

It is to be noted that terms "first", "second" and the like in the specification, claims and drawings of the present disclosure are adopted not to describe a specific sequence or order but to distinguish similar objects. It is to be understood that data used like this may be exchanged under a proper condition for implementation of the implementation modes, described herein, of the present disclosure in sequences besides those shown or described here.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. An optical imaging lens assembly, sequentially comprising from an object side to an image side along an optical axis:
   a first lens with a positive refractive power;
   a second lens with a refractive power;
   a third lens with a refractive power;
   a fourth lens with a positive refractive power;
   a fifth lens with a refractive power;
   a sixth lens with a positive refractive power; and
   a seventh lens with a negative refractive power; wherein
   Semi-FOV is a half of a maximum field of view of the optical imaging lens assembly, and an effective focal length f of the optical imaging lens assembly and Semi-FOV satisfy f*tan(Semi-FOV)≥5.0 mm;
   a curvature radius R11 of an object-side surface of the sixth lens, a curvature radius R12 of an image-side surface of the sixth lens and the effective focal length f of the optical imaging lens assembly satisfy 5.0<f/R11+f/R12<7.0; and
   a curvature radius R13 of an object-side surface of the seventh lens, a curvature radius R14 of an image-side surface of the seventh lens and an effective focal length f7 of the seventh lens satisfy f7/(R13−R14)≤−2.0.

2. The optical imaging lens assembly according to claim 1, wherein the effective focal length f of the optical imaging lens assembly, a curvature radius R1 of an object-side surface of the first lens and a curvature radius R8 of an image-side surface of the fourth lens satisfy 1.0<f/R1+f/R8<2.0.

3. The optical imaging lens assembly according to claim 1, wherein the effective focal length f of the optical imaging lens assembly and a curvature radius R10 of an image-side surface of the fifth lens satisfy 0<f/R10<1.5.

4. The optical imaging lens assembly according to claim 1, wherein the effective focal length f of the optical imaging lens assembly, a curvature radius R3 of an object-side surface of the second lens and a curvature radius R4 of an image-side surface of the second lens satisfy 1.4≤f/(R3−R4) <3.5.

5. The optical imaging lens assembly according to claim 1, wherein the curvature radius R11 of the object-side surface of the sixth lens, the curvature radius R12 of the image-side surface of the sixth lens and a center thickness CT6 of the sixth lens satisfy 2< (R12−R11)/CT6<4.5.

6. The optical imaging lens assembly according to claim 1, wherein a center thickness CT6 of the sixth lens and a center thickness CT7 of the seventh lens satisfy 1≤CT7/CT6≤2.1.

7. The optical imaging lens assembly according to claim 1, wherein the effective focal length f of the optical imaging lens assembly and the effective focal length f7 of the seventh lens satisfy −1.0<f/f7<−0.5.

8. The optical imaging lens assembly according to claim 1, wherein an effective focal length f1 of the first lens and a combined focal length f12 of the first lens and the second lens satisfy 0.9≤f12/f1≤1.5.

9. The optical imaging lens assembly according to claim 1, wherein the effective focal length f of the optical imaging lens assembly and a combined focal length f567 from the fifth lens to the seventh lens satisfy −0.5<f/f567<0.

10. The optical imaging lens assembly according to claim 1, wherein the effective focal length f of the optical imaging lens assembly and an effective focal length f4 of the fourth lens satisfy 0<f/f4<0.5.

11. The optical imaging lens assembly according to claim 1, wherein an effective focal length f6 of the sixth lens and the effective focal length f7 of the seventh lens satisfy −1.5<f6/f7<−0.5.

12. The optical imaging lens assembly according to claim 1, wherein Yc61 is a critical point height of the object-side surface of the sixth lens closest to the optical axis, Yc62 is a critical point height of the image-side surface of the sixth lens closest to the optical axis, and Yc61 and Yc62 satisfy 1<Yc62/Yc61<1.3.

13. The optical imaging lens assembly according to claim 1, wherein YT61 is a vector height of a critical point of the object-side surface of the sixth lens closest to the optical axis and YT62 is a vector height of a critical point of the image-side surface of the sixth lens closest to the optical axis, and YT61 and YT62 satisfy 1<YT62/YT61<1.2.

14. The optical imaging lens assembly according to claim 1, wherein ET5max is a maximum edge thickness of the fifth lens from the optical axis to an inflection point of an object-side surface of the fifth lens farthest from the optical axis, ET5min is a minimum edge thickness of the fifth lens from the optical axis to the inflection point of the object-side surface of the fifth lens farthest from the optical axis, and ET5max and ET5min satisfy (ET5max−ET5min)/ET5min≤0.25.

15. The optical imaging lens assembly according to claim 1, wherein an abbe number V4 of the fourth lens, an abbe number V5 of the fifth lens, an abbe number V6 of the sixth lens, and an abbe number V7 of the seventh lens satisfy 0<(V4+V6+V7)/3−V5<20.

16. The optical imaging lens assembly according to claim 1, wherein a focusing movement distance ΔT of the optical imaging lens assembly on the optical axis satisfies |ΔT|≤0.5 mm when a subject distance changes from an infinite distance to 8 centimeters.

17. An optical imaging lens assembly, sequentially comprising from an object side to an image side along an optical axis:
- a first lens with a positive refractive power;
- a second lens with a refractive power;
- a third lens with a refractive power;
- a fourth lens with a positive refractive power;
- a fifth lens with a refractive power;
- a sixth lens with a positive refractive power; and
- a seventh lens with a negative refractive power; wherein Semi-FOV is a half of a maximum field of view of the optical imaging lens assembly, and an effective focal length f of the optical imaging lens assembly and Semi-FOV satisfy f*tan(Semi-FOV)≥5.0 mm;

a curvature radius R11 of an object-side surface of the sixth lens, a curvature radius R12 of an image-side surface of the sixth lens and the effective focal length f of the optical imaging lens assembly satisfy 5.0<f/R11+f/R12<7.0; and an air space T23 between the second lens and the third lens on the optical axis, an air space T45 between the fourth lens and the fifth lens on the optical axis and an air space T67 between the sixth lens and the seventh lens on the optical axis satisfy 0< (T67−T23)/(T67−T45)≤1.3.

* * * * *